(12) United States Patent
Canton et al.

(10) Patent No.: US 11,200,372 B2
(45) Date of Patent: Dec. 14, 2021

(54) CALCULATIONS ON IMAGES WITHIN CELLS IN SPREADSHEETS

(71) Applicant: Microsoft Technology Licensing, LLC., Redmond, WA (US)

(72) Inventors: Christian M. Canton, Bellevue, WA (US); Carlos A. Otero, Seattle, WA (US); John Campbell, Woodinville, WA (US); Samuel C. Radakovitz, Seattle, WA (US); Matthew Hart Fichtner, Playa Vista, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 123 days.

(21) Appl. No.: 15/340,886

(22) Filed: Nov. 1, 2016

(65) Prior Publication Data

US 2017/0124057 A1    May 4, 2017

Related U.S. Application Data

(60) Provisional application No. 62/357,284, filed on Jun. 30, 2016, provisional application No. 62/357,292, (Continued)

(51) Int. Cl.
*G06F 17/00* (2019.01)
*G06F 40/18* (2020.01)
(Continued)

(52) U.S. Cl.
CPC ............ *G06F 40/18* (2020.01); *G06F 3/0482* (2013.01); *G06F 3/04817* (2013.01);
(Continued)

(58) Field of Classification Search
CPC .......................... G06F 17/246; G06F 3/04817
See application file for complete search history.

(56) References Cited

U.S. PATENT DOCUMENTS

| 4,815,029 A | 3/1989 | Barker et al. |
| 5,093,907 A * | 3/1992 | Hwong ................ G06F 17/246 |
| | | 345/473 |

(Continued)

FOREIGN PATENT DOCUMENTS

| CN | 101796829 A | 8/2010 |
| CN | 102842323 A | 12/2012 |

(Continued)

OTHER PUBLICATIONS

Shiozawa et al., "3D Interactive Visualization for Inter-Cell Dependencies of Spreadsheets" Proceedings 1999 IEEE Symposium on Information Visualization (InfoVis'99), pp. 1-4. (Year: 1999).*

(Continued)

*Primary Examiner* — Amelia L Tapp
(74) *Attorney, Agent, or Firm* — NovoTechIP International PLLC

(57) ABSTRACT

Described herein is a system and method for associating images with one or more cells in a spreadsheet application. As described, one or more images may be associated with a single cell in a spreadsheet application or it may be associated with a range of cells in the spreadsheet application. Information about the image, such as metadata, pixel information or other parameters, may be retrieved from the image. Once retrieved, a calculation engine may perform one or more calculations on the information in order to change an appearance of the image.

19 Claims, 9 Drawing Sheets

Related U.S. Application Data filed on Jun. 30, 2016, provisional application No. 62/249,869, filed on Nov. 2, 2015, provisional application No. 62/249,884, filed on Nov. 2, 2015.

(51) Int. Cl.

| | | |
|---|---|---|
| *G06F 40/106* | (2020.01) | |
| *G06F 40/177* | (2020.01) | |
| *G06F 40/197* | (2020.01) | |
| *G06F 3/0484* | (2013.01) | |
| *G06T 11/60* | (2006.01) | |
| *G06F 3/0482* | (2013.01) | |
| *G06F 3/0488* | (2013.01) | |
| *G06F 3/16* | (2006.01) | |
| *G06F 3/0481* | (2013.01) | |
| *G06T 11/20* | (2006.01) | |
| *G10L 15/26* | (2006.01) | |
| *G06K 9/00* | (2006.01) | |
| *G10L 13/033* | (2013.01) | |
| *G11B 27/00* | (2006.01) | |
| *G06T 1/00* | (2006.01) | |

(52) U.S. Cl.
CPC ...... *G06F 3/04842* (2013.01); *G06F 3/04845* (2013.01); *G06F 3/04847* (2013.01); *G06F 3/04883* (2013.01); *G06F 3/162* (2013.01); *G06F 3/165* (2013.01); *G06F 40/106* (2020.01); *G06F 40/177* (2020.01); *G06F 40/197* (2020.01); *G06K 9/00* (2013.01); *G06K 9/00442* (2013.01); *G06K 9/00449* (2013.01); *G06K 9/00463* (2013.01); *G06T 11/206* (2013.01); *G06T 11/60* (2013.01); *G10L 13/033* (2013.01); *G10L 15/26* (2013.01); *G11B 27/00* (2013.01); *G06T 1/0007* (2013.01); *G06T 2200/24* (2013.01)

(56) References Cited

U.S. PATENT DOCUMENTS

| | | | |
|---|---|---|---|
| 5,148,898 A | 9/1992 | Musachio | |
| 5,226,118 A | 7/1993 | Baker et al. | |
| 5,418,898 A | 5/1995 | Zand et al. | |
| 5,717,939 A | 2/1998 | Bricklin et al. | |
| 5,850,629 A | 12/1998 | Holm et al. | |
| 6,055,549 A | 4/2000 | Takano | |
| 6,088,708 A | 6/2000 | Burch | |
| 6,138,130 A | 10/2000 | Adler et al. | |
| 6,262,736 B1 | 7/2001 | Nelson | |
| 6,282,551 B1 | 8/2001 | Anderson | |
| 6,289,312 B1 | 9/2001 | Raman | |
| 6,289,513 B1 | 9/2001 | Bentwich | |
| 6,377,965 B1 | 4/2002 | Hachamovitch et al. | |
| 6,415,305 B1 | 7/2002 | Agrawal et al. | |
| 6,496,832 B2 | 12/2002 | Chi et al. | |
| 6,640,234 B1 | 10/2003 | Coffen | |
| 6,701,485 B1 | 3/2004 | Igra et al. | |
| 6,779,151 B2 | 8/2004 | Cahill et al. | |
| 6,785,660 B1 | 8/2004 | Fedor et al. | |
| 6,988,241 B1 | 1/2006 | Guttman et al. | |
| 7,047,484 B1 | 5/2006 | Becker et al. | |
| 7,350,141 B2 | 3/2008 | Kotler et al. | |
| 7,350,142 B2 | 3/2008 | Kraft | |
| 7,424,668 B2 | 9/2008 | DeSpain | |
| 7,451,397 B2 | 11/2008 | Weber et al. | |
| 7,594,172 B2 | 9/2009 | Fish | |
| 7,639,873 B2 | 12/2009 | Qian | |
| 7,647,551 B2 | 1/2010 | Vigesaa et al. | |
| 7,761,782 B1 | 7/2010 | Warren et al. | |
| 7,779,000 B2 | 8/2010 | Vigesaa et al. | |
| 7,783,966 B2 | 8/2010 | Mitsui | |
| 7,849,395 B2 | 12/2010 | Ellis et al. | |
| 7,853,867 B2 | 12/2010 | Egilsson | |
| 7,885,811 B2 | 2/2011 | Zimmerman et al. | |
| 7,962,436 B2 | 6/2011 | Brelage et al. | |
| 8,018,518 B2 | 9/2011 | Nobels | |
| 8,091,024 B2 | 1/2012 | Graeber | |
| 8,121,842 B2 | 2/2012 | Shih et al. | |
| 8,161,372 B2 | 4/2012 | Ellis et al. | |
| 8,166,385 B2 | 4/2012 | Garcia-Molina et al. | |
| 8,185,445 B1 | 5/2012 | Perlmuter | |
| 8,416,984 B2 | 4/2013 | Liang et al. | |
| 8,510,266 B1 | 8/2013 | Ho | |
| 8,515,241 B2 | 8/2013 | Forsyth et al. | |
| 8,516,389 B2 | 8/2013 | Fujimoto et al. | |
| 8,527,866 B2 | 9/2013 | Sutter et al. | |
| 8,640,022 B2 | 1/2014 | Waldman et al. | |
| 8,645,832 B2 | 2/2014 | Pea et al. | |
| 8,862,646 B1 | 10/2014 | Murayama et al. | |
| 9,020,999 B2 | 4/2015 | Rai | |
| 9,042,653 B2 | 5/2015 | Lin et al. | |
| 9,066,145 B2 | 6/2015 | Kilar et al. | |
| 9,098,484 B2 | 8/2015 | Viry | |
| 9,124,856 B2 | 9/2015 | Deshpande et al. | |
| 9,129,234 B2 | 9/2015 | Campbell et al. | |
| 9,141,938 B2 | 9/2015 | Goldberg | |
| 9,256,589 B2 | 2/2016 | Chitilian et al. | |
| 9,270,728 B2 | 2/2016 | Duncker et al. | |
| 9,280,533 B2 | 3/2016 | Rochelle et al. | |
| 9,317,963 B2 | 4/2016 | Ruble et al. | |
| 9,449,031 B2* | 9/2016 | Barrus | G06F 17/243 |
| 10,031,906 B2 | 7/2018 | Campbell et al. | |
| 10,311,141 B1* | 6/2019 | Olkin | G06F 40/18 |
| 10,366,157 B2 | 7/2019 | Campbell et al. | |
| 2002/0091871 A1 | 7/2002 | Cahill et al. | |
| 2003/0233616 A1 | 12/2003 | Gilinsky | |
| 2004/0143788 A1 | 7/2004 | Aureglia | |
| 2004/0246376 A1 | 12/2004 | Sekiguchi et al. | |
| 2005/0097464 A1 | 5/2005 | Graeber | |
| 2005/0246642 A1 | 11/2005 | Valderas et al. | |
| 2005/0251748 A1* | 11/2005 | Gusmorino | G06F 3/0481 715/713 |
| 2006/0012568 A1 | 1/2006 | Halcrow et al. | |
| 2006/0020899 A1 | 1/2006 | Gusmorino et al. | |
| 2006/0071942 A1 | 4/2006 | Ubillos | |
| 2006/0072848 A1 | 4/2006 | Razzano | |
| 2006/0106618 A1 | 5/2006 | Racovolis et al. | |
| 2006/0143651 A1 | 6/2006 | Kim | |
| 2006/0179012 A1 | 8/2006 | Jacobs | |
| 2006/0212469 A1 | 9/2006 | Babanov et al. | |
| 2006/0214776 A1 | 9/2006 | O'flaherty et al. | |
| 2006/0218483 A1* | 9/2006 | Weitzman | G06F 17/246 715/212 |
| 2006/0288284 A1 | 12/2006 | Peters et al. | |
| 2007/0124319 A1 | 5/2007 | Platt et al. | |
| 2007/0136652 A1 | 6/2007 | Ellis et al. | |
| 2007/0282976 A1 | 12/2007 | Matsuda | |
| 2008/0016436 A1 | 1/2008 | Liu et al. | |
| 2008/0028288 A1 | 1/2008 | Vayssiere et al. | |
| 2008/0147501 A1 | 6/2008 | Gilliam | |
| 2008/0148140 A1* | 6/2008 | Nakano | G06F 3/0482 715/215 |
| 2008/0156171 A1 | 7/2008 | Guldi | |
| 2008/0215959 A1 | 9/2008 | Lection | |
| 2008/0235625 A1 | 9/2008 | Holm et al. | |
| 2008/0276159 A1 | 11/2008 | Narayanaswami et al. | |
| 2008/0294903 A1 | 11/2008 | Miyazaki | |
| 2008/0301546 A1 | 12/2008 | Moore et al. | |
| 2009/0006466 A1* | 1/2009 | Ellis | G06F 40/18 |
| 2009/0006939 A1 | 1/2009 | Despain et al. | |
| 2009/0044090 A1 | 2/2009 | Gur et al. | |
| 2009/0044121 A1 | 2/2009 | Berger et al. | |
| 2009/0164880 A1 | 6/2009 | Lection | |
| 2009/0228837 A1 | 9/2009 | Suzuki | |
| 2009/0319542 A1 | 12/2009 | Le Brazidec | |
| 2010/0058163 A1 | 3/2010 | Garcia-Molina et al. | |
| 2010/0083079 A1 | 4/2010 | Rapp et al. | |
| 2010/0095198 A1 | 4/2010 | Bultrowicz | |
| 2010/0128855 A1 | 5/2010 | Demo et al. | |
| 2010/0131570 A1 | 5/2010 | Weinberg | |
| 2010/0211575 A1 | 8/2010 | Collins et al. | |

(56) References Cited

U.S. PATENT DOCUMENTS

| | | |
|---|---|---|
| 2010/0214299 A1 | 8/2010 | Robertson et al. |
| 2011/0029561 A1 | 2/2011 | Slaney |
| 2011/0035652 A1 | 2/2011 | McGarry |
| 2011/0040720 A1 | 2/2011 | Zangwill |
| 2011/0066933 A1 | 3/2011 | Ludwig |
| 2011/0078560 A1 | 3/2011 | Weeldreyer |
| 2011/0181617 A1 | 7/2011 | Tsuda |
| 2011/0209048 A1 | 8/2011 | Scott |
| 2011/0252299 A1 | 10/2011 | Lloyd et al. |
| 2012/0013539 A1 | 1/2012 | Hogan et al. |
| 2012/0013540 A1 | 1/2012 | Hogan |
| 2012/0039546 A1 | 2/2012 | Berger |
| 2012/0066574 A1 | 3/2012 | Lee et al. |
| 2012/0069028 A1 | 3/2012 | Bouguerra |
| 2012/0189203 A1* | 7/2012 | Lin .................... G06F 40/18 382/181 |
| 2012/0313957 A1 | 12/2012 | Fisher et al. |
| 2012/0324421 A1 | 12/2012 | Boeckenhauer et al. |
| 2013/0035075 A1 | 2/2013 | Seetharaman et al. |
| 2013/0036346 A1 | 2/2013 | Cicerone |
| 2013/0055058 A1* | 2/2013 | Leong .................... G06F 17/246 715/219 |
| 2013/0067305 A1 | 3/2013 | Golan |
| 2013/0110884 A1 | 5/2013 | Eakins |
| 2013/0117651 A1 | 5/2013 | Waldman et al. |
| 2013/0198666 A1 | 8/2013 | Matas et al. |
| 2014/0047312 A1 | 2/2014 | Ruble et al. |
| 2014/0104279 A1 | 4/2014 | Albrecht |
| 2014/0119673 A1 | 5/2014 | Rathnavelu |
| 2014/0122516 A1 | 5/2014 | Brewer et al. |
| 2014/0164890 A1 | 6/2014 | Fox et al. |
| 2014/0244668 A1 | 8/2014 | Barrus et al. |
| 2014/0337733 A1 | 11/2014 | Rodriguez |
| 2014/0337753 A1 | 11/2014 | McKellar |
| 2014/0359417 A1 | 12/2014 | Bar-On |
| 2014/0372850 A1 | 12/2014 | Campbell et al. |
| 2014/0372857 A1 | 12/2014 | Otero et al. |
| 2014/0372858 A1 | 12/2014 | Campbell et al. |
| 2014/0372952 A1 | 12/2014 | Otero et al. |
| 2015/0050010 A1 | 2/2015 | Lakhani et al. |
| 2015/0100880 A1 | 4/2015 | Matas et al. |
| 2015/0142418 A1 | 5/2015 | Byron |
| 2015/0161250 A1 | 6/2015 | Elbaz |
| 2015/0199118 A1 | 7/2015 | Berger et al. |
| 2015/0378979 A1 | 12/2015 | Hirzel et al. |
| 2016/0026376 A1 | 1/2016 | Schultink |
| 2016/0026613 A1 | 1/2016 | Vogel |
| 2016/0070733 A1 | 3/2016 | Gould |
| 2016/0093079 A1 | 3/2016 | Grams |
| 2016/0224536 A1 | 8/2016 | Thomas |
| 2017/0124040 A1 | 5/2017 | Campbell et al. |
| 2017/0124041 A1 | 5/2017 | Campbell et al. |
| 2017/0124042 A1 | 5/2017 | Campbell et al. |
| 2017/0124049 A1 | 5/2017 | Campbell et al. |
| 2017/0124050 A1 | 5/2017 | Campbell et al. |
| 2017/0124740 A1 | 5/2017 | Campbell et al. |
| 2017/0337040 A1 | 11/2017 | Salvi et al. |
| 2019/0258709 A1 | 8/2019 | Campbell et al. |
| 2020/0202069 A1 | 6/2020 | Campbell et al. |

FOREIGN PATENT DOCUMENTS

| | | |
|---|---|---|
| EP | 1645972 | 4/2006 |
| KR | 20140146350 A | 12/2014 |
| WO | 157744 | 8/2001 |
| WO | 2005050973 A2 | 6/2005 |
| WO | 2007118228 | 10/2007 |

OTHER PUBLICATIONS

Chang et al., "A Spreadsheet Model for Using Web Service Data" 2014 IEEE Symposium on Visual Languages and Human-Centric Computing (VL/HCC), pp. 169-176. (Year: 2014).*

"PhotoSpread Quick User's Manual", WebArchive online PDF, Jul. 8, 2011, 7 pages, http://web.archive.org/web/20110708161116/http://infolab.stanford.edu/~paepcke/shared-documents/photospread/photospreadmanual010309.pdf.

Chang, et al., "Creating interactive web data applications with spreadsheets", In Proceedings of the 27th annual ACM symposium on User interface software and technology, Oct. 5, 2014, pp. 87-96.

Kandel et al., "PhotoSpread: A Spreadsheet for Managing Photos", The 26th Annual Chi Conference on Human Factors in Computing Systems, Conference Proceedings, Apr. 5, 2005, in Florence, Italy, 10 pages.

"Customizing Points", May 25, 2014, https://developers.google.com/chart/interactive/docs/points, 9 pages.

"How to add image as background into chart in Excel?" Jul. 2, 2014, https://www.extendoffice.com/documents/excel/1435-excel-add-image-background-to-chart.html, 10 pages.

"Use a Picture in a Chart", Apr. 22, 2016, https://support.office.com/en-ie/article/use-a-picture-in-a-chart-c53cf530-160b-4a3e-9b38-efe6cb858d10, 3 pages.

"Sort data in a range or table" WebArchive Microsoft Office Support Webpage, Sep. 24, 2015, 8 pages, http://web.archive.org/web/20150924210037/https://support.office.com/en-us/article/sort-data-in-a-range-or-table-ce451a63-478d-42ba-adba-b6ebd1b4fa24.

"Spreadsheet plugin for Lightroom", Apr. 22, 2016, http://diswantsho.com/spreadsheet-plugin-for-lightroom/, 6 pages.

Agarwal, Amit., "How to Insert Images in your Google Spreadsheet Cells", Mar. 9, 2016, http://www.labnol.org/internet/images-in-google-spreadsheet/18167/, 2 pages.

Hasler et al., "A High Performance Interactive Image Spreadsheet" Computers in Physics, American Institute of Physics, Woodbury, NY, vol. 8, No. 3, May 1994, 18 pages.

Lafond, Gael., "eAtlas Image Metadata Editor Application—Tag photos with metadata", Mar. 20, 2016, http://eatlas.org.au/tools/image-metadata-editor, 15 pages.

PCT International Search Report in PCT/US2016/060177, dated Jan. 25, 2017, 16 pages.

PCT International Search Report in PCT/US2016/060192, dated Jan. 25, 2017, 15 pages.

Piersol, "Object-oriented spreadsheets: the analytic spreadsheet package", 1st Annual Conference on Object-Oriented Programming Systems, Languages, and Applications, Portland, Oregon, Jun. 1986, 6 pages.

Waldock, Jeff., "Applying mathematics to digital image processing using a spreadsheet", In Journal of MSOR Connections, vol. 10, Issue 3, Nov. 2010, pp. 11-16.

Wood, Mark., "Learn how to use Apple's spreadsheet program, Numbers", May 4, 2015, http://www.macworld.co.uk/how-to/mac-software/how-to-use-apple-numbers-speadsheet-3609483/, 9 pages.

PCT International Search Report in PCT/US2016/060025, dated Apr. 7, 2017, 23 pages.

Javaid, Usman, "Excel 2010: Merge Cells (Concatenation)", Published on: Mar. 25, 2010, http://www.addictivetips.com/microsoft-office/excel-2010-merge-cells-concatenation/, 19 pages.

Levoy, Marc, "Spreadsheets for Images", In Proceedings of 21st International ACM Conference on Computer Graphics and Interactive Techniques, Jul. 24, 1994, 8 pages.

Anchor image to a cell, Published on: Jan. 14, 2012, http://apache-poi.1045710.n5.nabble.com/Anchor-image-to-a-cell-td4302682.html, 14 pages.

Combine the contents of multiple cells, Retrieved on: Jan. 25, 2016, https://support.office.com/en-us/article/Combine-the-contents-of-multiple-cells-3A86C317-6B91-4F1D-8781-203320AEFDCE, 3 pages.

French, Ted, "Concatenate Text Data in Google Spreadsheets", Published on: Jun. 15, 2014, http://spreadsheets.about.com/od/exceltextfunctions/ss/2014-06-15-google-spreadsheets-concatenate-text-strings.htm#step1, 6 pages.

How To Concatenate Cells in Excel, Published on: Jul. 9, 2007, https://wagda.lib.washington.edu/gishelp/tutorial/concatenate.pdf, 6 pages.

How to insert multiple pictures and resize them at once in Excel?, Published on: Oct. 9, 2014, http://www.extendoffice.com/documents/excel/1156-excel-insert-multiple-pictures.html, 18 pages.

(56) References Cited

OTHER PUBLICATIONS

How to insert picture into excel cell, Published on: May 30, 2013, http://trumpexcel.com/2013/05/insert-picture-into-excel-cell/, 9 page.
How to resize pictures to fit cells in Excel?, Published on: Jan. 15, 2013, http://www.extendoffice.com/documents/excel/1060-excel-resize-picture-to-fit-cell.html, 11 pages.
Klement, Scott, "Load Images into Your HSSF Spreadsheets", Published on: Dec. 11, 2008, http://www.easy400.net/hssfcgi/documentation/20081211.html, 9 pages.
Reynolds, Janine, "New in Smartsheet: See Images in Your Sheets", Published on: Jan. 15, 2016, https://www.smartsheet.com/blog/new-in-smartsheet-embed-images, 16 pages.
Harvey, Greg, "How to Edit and Format Inserted Pictures in Excel 2013", Published on: Jan. 2013, http://www.dummies.com/how-to/content/how-to-edit-and-format-inserted-pictures-in-excel-.html, 3 pages.
Insert Images into Google Spreadsheet Cells, Published on: Apr. 15, 2016, https://www.bettercloud.com/monitor/the-academy/insert-images-into-google-spreadsheet-cells/, 3 pages.
Puls, Ken, "Using VLOOKUP to return a picture", Published on: Feb. 7, 2014, http://www.cga-pdnet.org/pdf/vlookupforpictures.pdf, 7 pages.
Wyatt, Allen, "Displaying Images based on a Result", Published on: Apr. 10, 2011, http://excel.tips.net/T003128_Displaying_Images_based_on_a_Result.html, 10 pages.
Wyatt, Allen, "Hiding Graphics when Filtering", Retrieved on: Jul. 8, 2016, http://excel.tips.net/T003866_Hiding_Graphics_when_Filtering.html, 2 pages.
An Introduction to Data Validation in Excel, Published on: Mar. 15, 2014, http://trumpexcel.com/2014/03/learn-all-about-data-validation-in-excel/, 4 pages.
Canton et al., "Compound Data Types", Oct. 2, 2015, 16 pages.
Canton et al., "Condensed Core Design", Jul. 30, 2015, 312 pages.
Canton et al., "Rich Data Types", Jul. 30, 2015, 217 pages.
Chang, et al., "A spreadsheet model for using web service data", In Proceedings of IEEE Symposium on Visual Languages and Human-Centric Computing, Jul. 28, 2014, 8 pages.
Create an Excel Drop Down list with Search Suggestions, Published on: Oct. 19, 2013, http://trumpexcel.com/2013/10/excel-drop-down-list-with-search-suggestions/, 11 pages.
French, Ted, "Convert Measurements in Excel", Published on: Mar. 18, 2011, http://spreadsheets.about.com/od/excel2010functions/ss/2011-03-18-Convert-Measurements-In-Excel-2010.htm, 4 pages.
Hoydahl, Jan, "Cominvent AS—Enterprise Search Consultants", Published on: Jan. 25, 2012, http://www.cominvent.com/2012/01/25/super-flexible-autocomplete-with-solr/, 4 pages.
In-Cell Dropdown and Validation in Spreadsheets, Published on: Aug. 26, 2010, http://googledrive.blogspot.in/2010/08/in-cell-dropdown-and-validation-in.html, 27 pages.
Lim, Jon, "Google Spreadsheets: COUNT with Multiple Values in Cells", Published on: Apr. 7, 2014, http://jonlim.ca/2014/04/google-spreadsheets-count-multiple-values-cells/, 5 pages.
Sartain, JD., "How to create relational databases in Excel 2013", Published on: Aug. 7, 2014, http://www.pcworld.com/article/2462281/how-to-create-relational-databases-in-excel-2013.html, 11 pages.
Singh, et al., "Transforming Spreadsheet Data Types using Examples", In Proceedings of Annual Symposium on Principles of Programming Languages, Oct. 26, 2015, 13 pages.
Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.
Use Formula AutoComplete, Retrieved on: Oct. 26, 2015, https://support.office.com/en-us/article/Use-Formula-AutoComplete-6d13daa5-e003-4431-abab-9edef51fae6b, 4 pages.
Lee, "Tips and Tricks: Images in cells", Nov. 30, 2010, https://drive.googleblog.com/2010/11/tips-and-tricks-images-in-cells.html, 6 pages.
"Indexed color—Wikipedia", Apr. 21, 2015, 6 pages, https://en.wikipedia.org/w/index.php?title=indexed_color&oldid=657815639.

"Spreadsheets (change book settings in bulk)", Sep. 23, 2014, https://support.google.com/books/partner/answer/3058975?hl=en, 11 pages.
U.S. Appl. No. 15/199,836, Final Office Action dated Apr. 9, 2018, 16 pages.
U.S. Appl. No. 15/199,820, Final Office Action dated Apr. 26, 2018, 16 pages.
U.S. Appl. No. 15/199,820, Amendment and Response filed Dec. 20, 2017, 16 pages.
U.S. Appl. No. 15/199,836, Amendment and Response filed Dec. 20, 2017, 13 pages.
U.S. Appl. No. 15/199,846, Amendment and Response filed Dec. 26, 2017, 15 pages.
U.S. Appl. No. 15/199,846, Advisory Action dated Jan. 5, 2018, 3 pages.
PCT International Preliminary Report on Patentability in PCT/US2016/060177, dated Jan. 4, 2018, 10 pages.
PCT International Preliminary Report on Patentability in PCT/US2016/060192, dated Jan. 5, 2018, 9 pages.
U.S. Appl. No. 15/199,846, Amendment and Response filed Jan. 26, 2018, 15 pages.
U.S. Appl. No. 15/199,846, Notice of Allowance dated Mar. 20, 2018, 10 pages.
Brian C. Whitmer, "Brigham Young University Improving Spreadsheets for Complex Problems", All These and Dissertations, Paper 1713, Apr. 8, 2008, http://scholarsarchive.byu.edu/cgi/viewcontent.cgi?artcile=2712&context=etd, pp. 1-7, 15-26.
Bakke et al., "A spreadsheet-based user interface for managing plural relationships in structured data", Human Factors in Computing Systems, May 7, 2011, 10 pages.
Chang, et al., "A Spreadsheet Model for Handling Streaming Data", In Proceedings of the 33rd Annual ACM Conference on Human Factors in Computing Systems, Apr. 18, 2015, 4 pages.
PCT International Search Report in PCT/US2016/059852, dated Jan. 25, 2017, 15 pages.
PCT Invitation to Pay Additional Fees in PCT/US2016/060180, dated Feb. 9, 2017, 8 pages.
U.S. Appl. No. 15/199,846, Office Action dated Jun. 26, 2017, 20 pages.
PCT International Search Report and Written Opinion in PCT/US2016/060180, dated Jul. 12, 2017, 22 pages.
Han et al., "Situational data integration with data services and nested table", Service Oriented Computing and Applications, vol. 7, No. 2, Apr. 27, 2012, pp. 129-150.
U.S. Appl. No. 15/199,836, Amendment and Response filed Jun. 27, 2018, 14 pages.
U.S. Appl. No. 15/340,187, Office Action dated May 18, 2018, 32 pages.
PCT International Preliminary Report on Patentability in PCT/US2016/060025, dated May 8, 2018, 16 pages.
PCT International Preliminary Report on Patentability in PCT/US2016/060180, dated May 8, 2018, 15 pages.
U.S. Appl. No. 15/199,820, Office Action dated Apr. 26, 2018, 16 pages.
PCT International Preliminary Report on Patentability in PCT/US2016/059852, dated May 8, 2018, 11 pages.
PCT International Preliminary Report on Patentability in PCT/US2016/059876, dated May 8, 2018, 8 pages.
U.S. Appl. No. 15/199,836, Office Action dated Apr. 9, 2018, 16 pages.
U.S. Appl. No. 15/199,820, Office Action dated Sep. 20, 2017, 16 pages.
PCT Second Written Opinion in PCT/US2016/060177, dated Sep. 14, 2017, 9 pages.
Sundarsean et al., Management and Analysis of Cmaer Trap Data: Alternative Approaches, Bulletin of the Ecological Socierty of America, vol. 92, No. 2, 201--04-01, pp. 188-195.
U.S. Appl. No. 15/199,836, Office Action dated Sep. 20, 2017, 14 pages.
PCT Second Written Opinion in PCT/US2016/060192, dated Sep. 11, 2017, 8 pages.
U.S. Appl. No. 15/199,846, Amendment and Response filed Sep. 26, 2017, 14 pages.

(56) References Cited

OTHER PUBLICATIONS

U.S. Appl. No. 15/199,846, Office Action dated Oct. 26, 2017, 22 pages.
"Final Office Action Issued in U.S. Appl. No. 15/340,187", dated Jan. 2, 2019, 52 pages.
"Non-Final Office Action Issued in U.S. Appl. No. 15/340,201", dated Jan. 2, 2019, 14 pages.
"Non Final Office Action Issued In U.S. Appl. No. 15/339,101", dated Sep. 10, 2018, 26 Pages.
"International Search Report and Written Opinion Issued in PCT Application No. PCT/US2016/059876", dated Jan. 25, 2017, 15 Pages.
"Advisory Action Issued in U.S. Appl. No. 15/340,187", dated Mar. 26, 2019, 5 Pages.
"Non-Final Office Action Issued in U.S. Appl. No. 15/340,187", dated May 1, 2019, 60 Pages.
"Non Final Office Action Issued in U.S. Appl. No. 15/199,836", dated Jul. 10, 2019, 18 Pages.
"Final Office Action Issued in U.S. Appl. No. 15/340,201", dated Jul. 11, 2019, 15 Pages.
"Non-Final Office Action Issued in U.S. Appl. No. 15/199,820", dated Jul. 17, 2019, 24 pages.
"5 Ways to Extract Video Frames and Save to Images", Retrieved From: https://www.raymond.cc/blog/extract-video-frames-to-images-using-vlc-media-player/, Apr. 7, 2016, 12 Pages.
"Deliver Content Using Spreadsheet Templates", Retrieved From: https://support.google.com/youtube/answer/6066171?hl=en, Sep. 21, 2015, pp. 1-4.
"How To: Use Text-to-Speech in Excel 2002", Retrieved From: https://support.microsoft.com/en-us/kb/288986, Retrieved on: Jul. 14, 2016, pp. 1-4.
"Powerful Transcription That's Ready for Work", Retrieved From: https://www.nuance.com/en-au/dragon/transcription-solutions.html, Dec. 17, 2015, 6 Pages.
"Rivendell—Scenario: breakaway from normal progaming to playout audiobook chapters, for a length of lime and rejoing normal programming. And how to load and playout the audiobook discs/tracks in order", Retrieved From: https://thebrettblog.wordpress.com/, Apr. 3, 2016, 32 Pages.
Vaziri, et al., "Stream Processing with a Spreadsheet", In Proceedings of European Conference on Object-Oriented Programming, Jul. 28, 2014, pp. 360-384.
"Trying to Open Audio Files from Spreadsheet Using Windows API", Retrieved From: https://stackoverflow.com/questions/34459965/trying-to-open-audio-files-from-spreadsheet-using-windows-api, Retrieved On: Aug. 1, 2018, 6 Pages.
"Notice of Allowance Issued in U.S. Appl. No. 15/340,187", dated Sep. 18, 2019, 9 Pages.
Azzarello, et al., "Group Report: Improving Computer Audio and Music Production Systems User Interfaces", In Proceedings of Tenth Annual Interactive Music Conference, Oct. 13, 2005, pp. 1-12.
Chang, et al., "A Spreadsheet Tool for Creating Web Applications Using Online Data", In Proceedings of CHI Workshop on End User Development in the Internet of Things Era, vol. 12, Issue 2, Apr. 18, 2015, pp. 39-44.
Dalgleish, Debra, "Excel List of All MP3 Files in a Directory", Retrieved From: https://contexturesblog.com/archives/2009/05/05/excel-list-of-all-mp3-files-in-a-directory/, May 5, 2009, 1 Page.
Eastonz, Trevor, "Embed a Video in Microsoft Excel—It's a breeze", https://www.onlinepclearning.com/embed-a-video-in-microsoft-excel/, Jul. 18, 2013, 7 Pages.
Hacid, et al., "A Database Approach for Modeling and Querying Video Data", Published in IEEE Transactions on Knowledge and Data Engineering, vol. 12, Issue 5, Sep. 2000, pp. 729-750.
Keng, Kuek Ser Kuang, "Edit Video Using Spreadsheet—GS Video", Retrieved From: https://www.youtube.com/watch?v=-bwFdhJg1MA, Dec. 24, 2015, 3 Pages.
Lacinak, Chris, "Embedded Metadata in WAVE Files", Retrieved From: https://www.avpreserve.com/wp-content/uploads/2014/04/EmbeddedMetadata.pdf, Retrieved On: Aug. 1, 2018, 10 Pages.
Machlis, Sharon, "How to Create an Automatically Updating Google Spreadsheet", Retrieved From: https://www.computerworld.com/article/2469616/business-intelligence/business-intelligence-79661-how-to-create-an-automatically-updating-spreadsheet.html, Apr. 21, 2017, 9 Pages.
Mrostek, Paul, "The Power User's Guide to Soundminer Metadata", Retrieved From: http://www.creativefieldrecording.com/2014/06/24/the-power-users-guide-to-soundminer-metadata/, Jun. 24, 2014, 10 Pages.
Wyatt, Allen, "Conditionally Playing an Audio File", Retrieved From: https://web.archive.org/web/20111010083233/https://excel.tips.net/T006559_Conditionally_Playing_an_Audio_File.html, Oct. 10, 2011, 2 Pages.
Wyatt, Allen, "Inserting a Sound File in Your Worksheet", Retrieved From: https://web.archive.org/web/20140706103351/http://excel.tips.net:80/T002864_Inserting_a_Sound_File_in_Your_Worksheet.html, Retrieved on: Jul. 6, 2014, 2 Pages.
Wyatt, Allen, "Inserting a Voice Annotation in Your Worksheet", Retrieved From: https://web.archive.org/web/20150627025332/http://excel.tips.net:80/T002870_Inserting_a_Voice_Annotation_in_Your_Worksheet.html, Retrieved On: Jun. 27, 2015, 2 Pages.
Wyatt, Allen, "Sorting with Graphics", Retrieved From: https://web.archive.org/web/20160715175841/https://excel.tips.net/T002954_Sorting_with_Graphics.html, Retrieved on: Jul. 15, 2016, 2 Pages.
"Non Final Office Action Issued in U.S. Appl. No. 15/340,201", dated Apr. 24, 2020, 16 Pages.
"Final Office Action Issued in U.S. Appl. No. 15/340,201", dated Sep. 22, 2020, 16 Pages.
"Non Final Office Action Issued in U.S. Appl. No. 16/400,385", dated Sep. 25, 2020, 16 Pages.
"Non Final Office Action Issued in U.S. Appl. No. 16/806,977", dated Jan. 28, 2021, 23 Pages.
"Non Final Office Action Issued in U.S. Appl. No. 15/340,201", dated Mar. 17, 2021, 19 Pages.
"Final Office Action Issued in U.S. Appl. No. 16/400,385", dated Apr. 1, 2021, 13 Pages.

* cited by examiner

CALCULATIONS ON IMAGES WITHIN CELLS IN SPREADSHEETS

RELATED APPLICATIONS

This application claims priority to U.S. Provisional Application No. 62/249,884, entitled "Compound Data Types," filed on Nov. 2, 2015; U.S. Provisional Application No. 62/249,869, entitled "Rich Data Types," filed Nov. 2, 2015; U.S. Provisional Application No. 62/357,292, entitled "Compound Data Objects," filed on Jun. 30, 2016; and U.S. Provisional Application No. 62/357,284, entitled "Rich Data Types," filed on Jun. 30, 2016; the entire disclosures of which are hereby incorporated in their entireties herein by reference.

BACKGROUND

Today, images may be added to spreadsheets, but the images "float" over the grid. In this case, the images are not associated with any particular cell, nor are they related to data within the spreadsheet. Accordingly, when operations are performed on the spreadsheet, e.g., sort, filter, cell resizing, etc., the images do not behave as a user expects. That is, rather than moving with cells when the cells are reordered within the spreadsheet, the images may become randomly scattered within the spreadsheet which may result in some of the data being obstructed by the image. Additionally, the appearance of the image cannot be manipulated. As a result, in order to change the appearance of the image, third party imaging software may be needed to change the image. The changed image may then be imported into the spreadsheet application.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for associating one or more images with one or more cells of a spreadsheet. More particularly, this disclosure generally relates to performing a calculation function on an image within the spreadsheet. In order to perform a calculation function on the image, data associated with the image is retrieved using one or more functions. A calculation function or other operation may be performed on the data. In some instances, performing a calculation function or other operation on the data associated with the image alters an appearance of the image.

In aspects, when an image file is associated with one or more cells in the spreadsheet application, the image file may be treated as a new type of value. In some aspects, a plurality of images may be associated with a single cell or a single image may be associated with a range of cells. In further aspects, both an image and additional data may be associated with a single cell. In some cases, the image may be provided as a background for the cell and the additional data may be displayed over the image. In other cases, the associated image may be displayed adjacent the additional data, wrapped by the additional data, etc.

Upon associating an image with a cell, various parameters associated with the image may be identified and surfaced for viewing and/or manipulation by a user. Additionally, one or more calculation functions may be performed on the parameters or on data associated with the image. For example, various spreadsheet operations, including for example, sort, filter, and various calculation functions, may be performed on the parameters and/or data of the images. In yet other examples, fit and/or resize operations may be performed on an associated image.

In aspects, an associated image may move with a cell when the cell is reordered within the cell table. Alternatively, an associated image may be allowed to float over the grid but, unlike prior systems, the associated image may be referenced by a function in a cell and operations may be performed on the associated image.

Accordingly, described herein is a system comprising at least one processing unit and at least one memory storing computer executable instructions which, when executed by the at least one processing unit, causes the system to perform a method. This method includes receiving at least one image and obtaining information about the at least one image using a function associated with at least one cell of a spreadsheet. Using a calculation function associated with the spreadsheet, at least a portion of the information is changed to generate an updated image. The updated image may then be displayed on the spreadsheet.

Also described is a method for altering an appearance of an image associated with a spreadsheet application. This method includes selecting an image associated with a cell of the spreadsheet application and obtaining information about the image using a function associated with the cell in the spreadsheet application. The information is provided to a calculation function associated with the spreadsheet application. The calculation function changes at least a portion of the information to generate an updated image.

In further aspects, a computer-readable storage medium storing computer executable instructions which, when executed by at least one processing unit, causes the processing unit to perform a method for altering the appearance of an image contained in a spreadsheet application. In this embodiment, data corresponding to the image is received and provided to a calculation function associated with the spreadsheet application. The appearance of the image is then altered using the calculation function to create an updated image. Once created, the updated image is displayed in the spreadsheet application.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
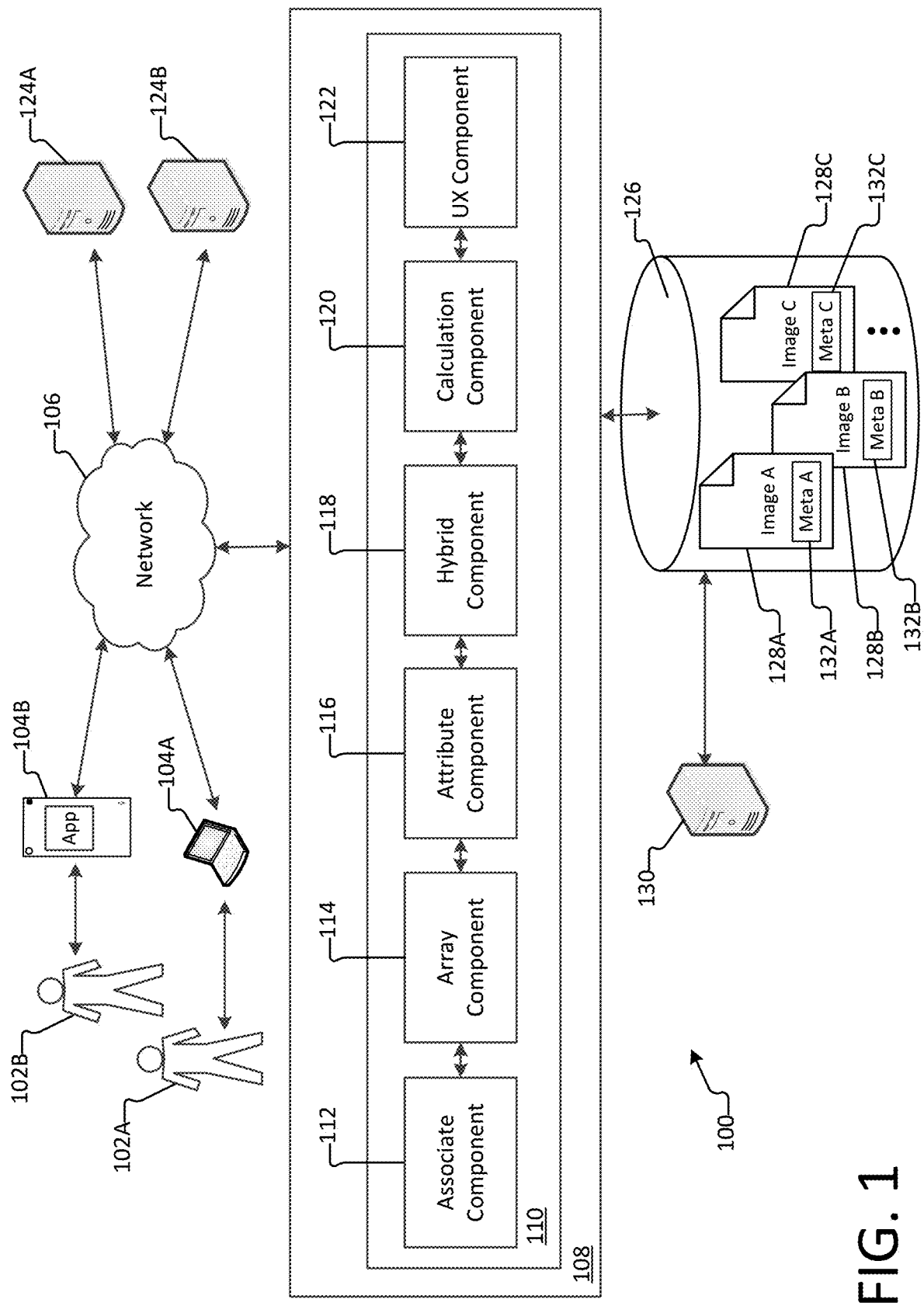
FIG. 1 illustrates a system for associating one or more images with one or more cells in a spreadsheet and for performing one or more calculation functions on the image, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to systems and methods for associating one or more images with one or more cells of a spreadsheet and enabling one or more calculation functions to be applied to those images. In some instances, the calculation performed on the image may change or otherwise alter the appearance of the image.

As will be described herein, images may be associated with cells by embedding an image in a cell, by anchoring an image to a cell and/or by referencing an image in a function associated with the cell. In some aspects, a plurality of images may be associated with a single cell or a single image may be associated with a plurality of cells. In further aspects, both an image and the additional data may be associated with a single cell. For instance, the associated image and the additional data may be referenced in a compound data type associated with the cell. In some cases, an associated image may be provided as background for the cell and the additional data may be displayed over (i.e., on top of) the associated image. In other cases, the associated image may be displayed adjacent the additional data (e.g., above, below, to the right or left) or wrapped by the additional data.

Upon associating an image with a cell, various parameters or other data and information associated with the image may be surfaced and fed into a calculation engine (or "calc engine") associated with the spreadsheet application. Additionally, various operations may be exposed for manipulating the various parameters and the data.

For instance, a calculation function may be performed on the image or on data or other information associated with the image. The calculation function may be used to change the appearance of the image. For example, the image, or a portion of the image, may be blurred, sharpened, change color, etc. in response to being subjected to the calculation function. Thus, the image, or data associated with the image, may be used as part of the various calculation functions available in the spreadsheet application.

In other aspects, image parameters may be used to invoke functions or other calculations in the spreadsheet. These functions or calculations may alter or otherwise update associated information or data in the spreadsheet. For example, a function or calculation may be invoked on data within a cell of the spreadsheet when an image has a certain opacity or color or when other image conditions have been satisfied. It is with respect to these and other general considerations that embodiments have been made.

FIG. 1 illustrates a system for associating one or more images with one or more cells in a spreadsheet application and enabling the spreadsheet application to alter the appearance of the image using a calculation function, according to an example embodiment.

The system 100 may include one or more client computing devices 104 (e.g., client computing devices 104A and 104B) that may execute a client version of a spreadsheet application. The spreadsheet application may be capable of associating images with various cells in a spreadsheet. In some examples, the client spreadsheet application may execute locally on a client computing device 104. In other examples, a client spreadsheet application (e.g., a mobile app on a thin client computing device 104) may operate in communication (e.g., via network 106) with a corresponding server version of spreadsheet application 110 executing on one or more server computing devices, e.g., server computing device 108. In still other aspects, rather than executing a client version of a spreadsheet application, the one or more client computing devices 104 may remotely access, e.g., via a browser over network 106, the spreadsheet application 110 implemented on the server computing device 108 or multiple server computing devices (e.g., in a distributed computing environment such as a cloud computing environment).

As illustrated by FIG. 1, a server version of spreadsheet application 110 is implemented by server computing device 108. As should be appreciated, the server version of spreadsheet application 110 may also be implemented in a distributed environment (e.g., cloud computing environment) across a plurality of server computing devices (not shown). Moreover, as should be appreciated, either a client or a server version of the spreadsheet application 110 may be capable of associating one or more images with cells of a spreadsheet and performing a calculation function on the data or other information associated with the image. While a server version of the spreadsheet application 110 and associated components 112-122 are shown and described, this should not be understood as limiting. Rather, a client version of spreadsheet application 110 may similarly implement components 112-122 on a client computing device 104.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list used as an example and should not be considered as limiting. Any suitable client computing device for executing a client spreadsheet application and/or remotely accessing spreadsheet application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the spreadsheet application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud computing environment). Server computing device 108 may provide data, including image data and image attributes, associated with cells of a spreadsheet to and from the one or more client computing devices 104 and/or one or more other server computing devices (e.g., server computing devices 124A and/or 124B) via network 106.

As used herein, each image may be stored as an image file in a file format identified by a file extension, such as .jpeg, .png, .gif, .tiff, etc., and may be retrieved based on a file locator, which may be a uniform resource locator (URL) identifying a file path to a local storage location or a remote storage location. In aspects, one or more image files (e.g., image files 128A, 128B, and 128C) may be stored in a storage location (e.g., storage 126) accessible to spreadsheet application 110. An image may be defined by image data (e.g., raw pixel data, an array of pixel values, or other data for rendering the image) and image attributes (e.g., opacity, color palette, resolution, aspect ratio, image dimensions, author, creation date and/or time, file name, tags, file size, GPS location information, etc.). As should be appreciated, each image attribute may be defined by an attribute-value pair. That is, an image attribute (e.g., image height) may be paired with a value for that attribute (e.g., 1.04 inches) for a particular image.

In at least some examples, image attributes may be organized in a data structure (e.g., a table, array, etc.) based on attribute-value pairs (e.g., for attribute "height" a value may be "1.04 inches"; for attribute "width" a value may be "1.39 inches"; for attribute "rotation" a value may be "0°"; and the like). For instance, a first column of attributes may be paired with a second column of values corresponding to the attributes, where each row of the dual-column array corresponds to an attribute-value pair. As should be appreciated, attribute-value pairs associated with image attributes may be organized and stored in any suitable data structure. In further examples, image attributes (e.g., organized by attribute-value pairs) may be appended as metadata to an image file comprising image data. For instance, as illustrated, metadata 132A may be appended to image file 128A, metadata 132B may be appended to image file 128B, and metadata 132C may be appended to image file 128C. Alternatively, the image attributes may be stored in a separate location or database from the image files and may be referenced by or otherwise indexed to the image files (not shown).

As may be appreciated, image data may include an array of pixel values that encodes, for example, RGB, RGBA or YUV color space information, which is data in a machine-readable format for rendering the combination of colors, luminance, chrominance and/or opacity for each portion or tile of an image. In some aspects, the number of pixels may be represented dimensionally, e.g., "3552×2000" pixels. In contrast, image attributes may describe the image file, image data and/or the rendered image in a human-readable format. For example, some image attributes may describe the image data by specifying a quantity (e.g., opacity value, luminance or brightness value, etc.) or a quality (e.g., high-red color palette, high opacity, low luminance, etc.) of the image data. Other image attributes may describe image specifications, such as image size, image aspect ratio, image resolution, etc. Still further image attributes may provide details regarding the image file, such as creation date/time, author, etc.

In at least some examples, one or more image files may be stored in different storage locations within a distributed environment (e.g., cloud computing environment) accessible to spreadsheet application 110 over a network, e.g., network 106. As described herein, the location of an image file in storage may be represented by a file locator, which may be a URL to local storage (e.g., C:\Pictures\elephant1.jpeg) or a URL to remote storage accessible over a network (e.g., http://www.pics.com/tree.png). Additionally, an image file may be referenced by name (e.g., "elephant1.jpeg") to locate it within the local workbook file. With respect to remote storage, a URL may provide a file path to a storage location hosted by a third party (e.g., Dropbox®, etc.), in a public or private cloud storage location (e.g., OneDrive®, iCloud®, Amazon® Cloud Drive, etc.), in an enterprise storage location (e.g., SharePoint®, etc.), in a public storage location accessed over the Internet, and the like. In other aspects, the image file may be referenced within a function of the spreadsheet by a globally unique name rather than by a URL. A globally unique name can be any string, e.g., "elephant," or "elephant1" or "elephant.jpg," that uniquely identifies the image file within the spreadsheet workbook. For instance, to call the image file from another cell in the spreadsheet, the function "=elephant" may be used in the cell. However, if the same name is used on different sheets of a spreadsheet to return different values, the name may be qualified by the sheet on which it appears in order to create a unique name, e.g., "Sheet1!OctoberEarnings" and "Sheet2!OctoberEarnings."

As illustrated in FIG. 1, the spreadsheet application 110 may include various components for associating one or more images with one or more cells of a spreadsheet and for performing one or more calculations on the one or more images. These components include, but are not limited to, an associate component 112, an array component, 114, an attribute component 116, a hybrid component 118, a calculation component 120, a UX component 122, and the like.

In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 124A, 124B and/or 130), or locally on a client computing device (e.g., client computing device 102A or 102B).

As described above, the spreadsheet application 110 may be configured to associate one or more images with one or more cells of a spreadsheet. Once the image is associated with the spreadsheet, a calculation function may be applied to the image. In some instances, the calculation function may alter the appearance of the image. For instance, the color of the image may change based on actual or forecasted sales data, actual sales data, and so on. Further, various parameters associated with the image may cause one or more functions to be performed on the image itself or on other data contained in the spreadsheet application.

As should be appreciated, while examples and descriptions provided below may generally reference associating a single image with a single cell and performing a calculation on that image, the methods and systems described may similarly be applied for multiple images over multiple cells. In cases where application of the methods or systems may differ with respect to associating multiple images with a single cell and/or associating a single image with multiple cells, additional disclosure will be provided.

In aspects, associate component 112 may associate one or more images with one or more cells of a spreadsheet. In some aspects, associate component 112 may associate an image by directly embedding the image into a cell. For instance, the image file, along with associated image data and image attributes, may be embedded in the cell as a value and the image may be drawn in the same pixelated space within the spreadsheet as the cell. In aspects, rather than a function, a name of the embedded image may be provided in a formula bar depicting the contents of the cell. In further aspects, an embedded image may be drawn as background (or fill) for the cell, allowing additional data to be entered into the cell.

Alternatively, the cell may contain only the embedded image. An image embedded within a cell may further be "fit" to a cell size, i.e., bounded by the cell border, and may move with the cell when the cell is relocated within the spreadsheet (e.g., in response to a sort or filter operation). In this regard, an embedded image may behave in substantially the same or similar way as alphanumeric data (e.g., textual data, numeric data, formulas, and the like) and, thus, may behave predictably within the spreadsheet in response to calculations, functions, or other operations that are performed on the image and/or on data associated with the image.

In further aspects, associate component 112 may associate an image by anchoring the image as a value within a cell of the spreadsheet. For example, the image may be anchored within a cell based on a function in the formula bar of the cell that identifies the file locator (e.g., a globally unique name or URL) for the image file (e.g., =IMAGE("http://www.mattspics.com/weather/rainyday.png")). Alternatively, an image file may be associated with a cell without using a globally unique name or URL by selecting an "Insert" operation in the toolbar and using a dialog filtered to image types to find and insert the image file. In that case, the formula for the cell may specify an array containing two images as: "=IMAGE(4two.png, red.png)". Alternatively, the images may be identified without a formula, for instance, the names of the images may simply be listed without the "=IMAGE" operator, e.g., "4two.png, red.png" or "<Image>4two.png, red.png".

In still other aspects, the associate component 112 may associate an image with the spreadsheet but may allow the image to float over the grid. When an image is allowed to float over the grid (e.g., over one or more cells of the spreadsheet), the image may be displayed with the spreadsheet but may or may not move with cells as they are relocated within the spreadsheet (e.g., in response to sort or filter operations). In some examples, although the image may be allowed to float, the image may be referenced (e.g., by globally unique name) in one or more functions (e.g., a calculation function, a sort function, etc.) within the spreadsheet such that one or more calculations or other operations may be performed on the image.

Similarly, whether or not the image is anchored, floating or even displayed within the spreadsheet, the image may be referenced (e.g., by globally unique name) in one or more functions such that one or more operations may be performed on the image and/or one or more operations may be performed on the spreadsheet based on attributes of the image. For instance, the image may not be displayed in the spreadsheet unless and until a condition associated with the function that references the image is satisfied (e.g., display referenced image as background when revenue number hits "X"). Likewise, a calculation may not be performed on an image to change the appearance of the image until a condition is satisfied (e.g., change the image from a first color to a second color when certain sales quotas have been reached).

In an example, consider a realtor visiting a residential property. The realtor may wish to take a photo of the property on his or her mobile device and may further wish to associate the photo with a spreadsheet. For instance, the realtor may wish to associate the photo with a row of a spreadsheet including cells with data describing the property (e.g., price, address, number of bedrooms, number of bathrooms, etc.). In some aspects, the realtor may open a mobile version of the spreadsheet application (e.g., spreadsheet application 110), may select a cell within the spreadsheet, and may select the photo to insert into the cell. In aspects, the mobile version of the spreadsheet application may automatically associate the image with the selected cell. In other aspects, the realtor may select a cell within the spreadsheet and activate a "take photo" icon for taking a photo and inserting the photo into the cell.

In some aspects, a user may "change a state" of an image with respect to a cell at any time. That is, a user may make a selection to "pop out" an image from display within a cell to display outside (or over) a cell or cells (e.g., in cases where the image is difficult to view within the cell). Alternatively, a user may make a selection to convert an image from a floating image to an image that is anchored or embedded within a cell. In this case, the floating image may be selected (e.g., by right click) and may be anchored or embedded to a selected cell. A user may also make a selection to convert an image from embedded or anchored in a cell to floating. In this case, the image may no longer be represented in the formula bar of the cell and may be displayed as dissociated from the cell (e.g., in another location within the spreadsheet). As should be appreciated, UI controls (e.g., provided in an image toolbar, provided upon right click of a mouse, etc.) may allow the state of an image to be changed at any time.

Array component 114 may associate a plurality of images with one or more cells of a spreadsheet. Similar to associate component 112, array component 114 may associate a plurality of images with a cell by directly embedding each image into the cell (e.g., in a collage arrangement). Alternatively, array component 114 may associate a plurality of images with a cell by anchoring the plurality of images to the cell based on a function identifying the file locators (e.g., globally unique names or URLs) for each of the plurality of images. In other aspects, array component 114 may associate a plurality of images with a cell based on a function identifying a folder in which the plurality of images is located. In still other aspects, array component 114 may associate the plurality of images with the spreadsheet by referencing a globally unique name for each of the plurality of images, but may allow the plurality of images to float over one or more cells. In at least some aspects, array component 114 may associate the plurality of images with one another (e.g., in an array) in addition to associating the plurality of images with a cell and/or a spreadsheet.

In an example, consider the realtor above visiting a residential property. The realtor may wish to take many photos of the property on his or her mobile device and may further wish to associate the photos with a spreadsheet. For instance, the realtor may wish to associate the photos with a row of a spreadsheet that includes cells with data describing the property (e.g., price, address, number of bedrooms, number of bathrooms, etc.). In some aspects, the realtor may open a mobile version of the spreadsheet application (e.g., spreadsheet application 110), may select a cell within the spreadsheet, and may select the photos to insert into the cell. In aspects, the mobile version of the spreadsheet application may automatically associate the plurality of photos in an array and insert the array in the selected cell. In other aspects, the realtor may select a cell within the spreadsheet and activate a "take photo" icon for taking a plurality of photos and inserting the photos in the cell. In still other aspects, the realtor may download the plurality of images and save the images in a folder on a desktop computing device. The realtor may then associate the folder with a selected cell in a spreadsheet. In this case, the spreadsheet application may automatically create an array from the folder of images (e.g., with an associated UI element) and may associate the array with the selected cell. As should be appreciated, any number of options for taking photos and associating the photos with one or more cells of a spreadsheet are conceivable and may be implemented in accordance with the methods and systems disclosed herein.

In aspects, attribute component 116 may retrieve parameters for each image associated with a spreadsheet. As detailed above, parameters retrieved for an image may include image data (e.g., an array of pixel values) and/or associated image attributes (e.g., image descriptors). In some aspects, attribute component 116 may retrieve parameters from a compound data type, as will be described further below. For instance, attribute component 116 may retrieve image data, image attributes, additional data, and/or formatting attributes from a compound data type. In aspects, attribute component 116 may retrieve parameters for an image and/or additional data at any time, for example, in response to a selection to associate the image with a spreadsheet, in response to a selection to manipulate the image, in response to a selection to perform a spreadsheet operation, a calculation operation or function, and the like.

Hybrid component 118 may associate different types of data with a single cell. In some cases, hybrid component 118 may provide the image as background for the cell and may display the additional data over the image. Alternatively, the image may be displayed in one portion of the cell and the additional data may be displayed in another portion of the cell (e.g., above, below, to either side, or wrapping the image). As detailed above, image data may include an array of pixel values for rendering an image. Additional data may include any type of data other than image data. For example, additional data may include textual data, numeric data, formulas, and the like (hereinafter referred to as "alphanumeric data"). Alternatively, additional data may include charts, videos, audio files, etc.

In a first aspect, hybrid component 118 may associate the image with the additional data in a structured format, such as an array, record, or table, which is referred to herein as a "compound data type." In aspects, when an image is provided as background (or fill) for a cell, use of a compound data type may not be necessary to associate different types of data with the cell. However, when the image and the additional data are displayed in different areas of the same cell, use of a compound data type may provide advantages. For example, when the image and the additional data are associated with a cell using a compound data type, layout properties for the image and the additional data may also be organized in the structured format. In some cases, compound data types may even be nested within each other.

The structure of a compound data type may be leveraged in complex calculations, thereby providing a model for referencing and using different aspects of the data. For example, each component of a compound data type may be represented by a formula or a function. Such individual representation of components facilitates the creation of structures in a single cell where calculations performed by various calculation functions can reference back to other components of the compound data type.

For instance, any of the fields of the compound data type can be dereferenced and acted on. That is, a formula may be constructed to get the value of a special field ("=GetAttribute(<field name>)"), an operator may be used to get the value (e.g., the dot "." operator, "=A1.aspectratio"), or a unique name may be used to get the value (e.g., if cell A1 has a unique name, "OctoberEarningsRecording.aspectratio"). One or more calculations may then be performed on the data associated with the field or retrieved value. As a result of the calculation, the appearance of the image may be changed.

In yet further examples, specific metadata associated with the image and/or the compound data type, may be referenced or otherwise accessed using specified functions. These functions may be associated with certain aspects of the metadata and may be generated by a user or may be native to the spreadsheet application.

For example, in order to access data regarding where the image was taken, a function "=ImageLocation ( )" may be used to access coordinates of the captured image. As described above, a dot "." operator may also be used to access certain metadata. For example, a function "=<image (or cell reference to an image)>.metadata <property name>" may be used to access certain portions of data within the image or compound data type. In yet another example, a function "=ImageMetaData ("parameters")" may be used to specify which portions of the metadata should be accessed.

In some instances, it may be desirable to return or otherwise access all metadata associated with an image or a compound data type. In such cases, a function call may be used to return all the data associated with an image in an array or other data structure.

Once the data, or portions of the data, is retrieved or otherwise accessible, a calculation engine associated with the spreadsheet application may perform a calculation, or a chain of calculations, on the image data. The calculations may alter the appearance of the image. For example, the retrieved metadata may be changed by a calculation or function, new metadata may be added by a calculation or function, a copy of the metadata may be made and placed in another cell as a result of the calculation or function and so on.

In some instances, a compound data type may include data types such as: image data, image attributes, alphanumeric data, audio data, video data, charts, and the like. In aspects, a compound data type may be an object referencing an image file (including image data and metadata), as well as additional data (e.g., any other type of data), in a structured format. In some aspects, additional data may be described in terms of attribute-value pairs, arrays, vectors, etc. In this case, hybrid component 118 may leverage the natural attribute-value descriptors for organizing the additional data within the structured format of a compound data type. As should be appreciated, in some aspects, an image itself may be represented by a compound data type.

For example, as described above, an image file may comprise image data (e.g., an array of pixel values) and associated metadata (e.g., including image attributes). The image attributes may be described in terms of attribute-value pairs and/or may be organized in any suitable structured format, e.g., an array of values, a record with an array of fields, a table, an array of vectors, etc. For example, for attribute "height" a value may be "1.04 inches"; for attribute "width" a value may be "1.39 inches"; etc. Thus, an image may be represented by a compound data type in which the image data and the image attributes are stored in (or referenced by) a structured format. In aspects, an image represented by a compound data type may be associated with a cell.

Further, an image and additional data may be represented by a compound data type. For example, the image, including image data (e.g., an array of pixel values) and image attributes (e.g., attribute-value pairs corresponding to image attributes), may be associated with additional data (e.g., data describing the content of the image) in a single compound data type.

As briefly discussed above, an image, and a compound data type, may also have associated pixel data. The pixel data may be represented as a two dimensional (2D) array of pixels with each pixel having a value for R, G, B, A. In some instances, the pixel data may be retrieved or otherwise accessed using various functions, similar to the functions described above with respect to the image metadata. For example, a function "=ImagePixelData ( )" may return a 2D array or a 3D array of all pixel information in an image or compound data type. In other implementations, a dot "." operator may be used to access the pixel data, or specified portions of pixel data such as described above.

Once the pixel data is retrieved or otherwise accessible, various functions and calculations may be performed on the pixel data. In some instances, the functions or calculations change the appearance of the image. In other cases, the pixel data may trigger one or more calculations or functions. For example, if a new image is associated with a cell of a spreadsheet and the pixel values for one or more of the R, G, B, or A values is above a threshold, the calculation component 120 may implement a function or operations that changes the pixel values to a desired value.

The calculations and operations may overwrite the existing pixel data. In other implementations, a copy of the pixel data, and as a result, the associated image, may be made and placed in the same cell as the original image or in a different cell.

As discussed above, the calculations or operations change the appearance of the image or the compound data type. In addition to the examples above, additional functions may be used to change the appearance of an image. For example, a Gaussian blur may be performed on the pixel data. In other implementations, specific functions may be used on the pixel data to alter the appearance of the image or to provide special effects for the image. For example, a "=Glow ( )" operation may be performed on the pixel data to provide a glow effect for the image. In another example, a "=Blur ( )" operation may be performed on the pixel data to change the pixel data and provide a blurring effect on the image. In yet another example, a "=Sharpen ( )" operation may be performed on the pixel data to sharpen the image. In some cases, one or more of these functions may be combined on a single image.

When these functions are performed a new image, with the specified effect, may be generated and placed in a cell. In another embodiment, the existing image may be modified. In addition to the functions specified above, other functions may be applied to the pixel data that modify the appearance of the image. These include, but are not limited to, cropping an image, changing one or more dimensions of the image (e.g., height and/or width), compressing the image, changing the color saturation of an image, changing the opacity of the image and so on. Although specific examples are given, additional operations, functions and calculations may be performed on the pixel data and/or the metadata information retrieved from an image or compound data type.

The above concepts will now be illustrated in the following example. In this example, the image is an image of a car. The image file for the image of the car may include image data (e.g., an array of pixel values) for rendering the image of the car and associated metadata including image attributes (e.g., attribute-value pairs) defining aspects of the image, such as image resolution, image aspect ratio, image color palette, etc.

In some examples, additional data may describe or be related to the content of the image, such as a year, make, model, color, price, condition, etc., of the car depicted in the image. In this case, the additional data may also be represented by attribute-value pairs (e.g., content attributes). For instance, an attribute "year" may have a value "2015"; an attribute "make" may have a value "BMW"; an attribute "model" may have a value "Z4"; etc. In other examples, the additional data may not necessarily be represented by attribute-value pairs. For instance, the additional data may be a single numeric value that is the output of a formula (e.g., total revenue value, sum of a range of cell values, average value over a range of cell values, etc.). In still other examples, additional data may be represented as an array or vector of data, as well as any other primitive type (strings, numbers, etc.).

Further still, the additional data may be described by formatting attributes that may be represented by attribute-value pairs. For example, where the additional data is alphanumeric data, an attribute "font size" may have a value "11 pt."; an attribute "font color" may have a value "red"; an attribute "font" may have a value "Calibri"; etc. Furthermore, layout attributes may define a relative arrangement and/or dynamic display of image data, image attributes and additional data. For instance, layout attributes may define how to display data (e.g., image displayed above, below, to the left or the right of additional data, etc.) and/or which data should be dynamically displayed as a cell is resized (e.g., image icon displayed in small cell, with more data progressively displayed as the cell is enlarged). Layout attributes may also be defined in terms of attribute-value pairs, e.g., an attribute "alignment" may have value "top" or "left"; an attribute "progressive display" may have numerical values in order of priority such as 1-10, and the like.

Based on the above examples, hybrid component 118 may create a compound data type including the image data (e.g., an array of pixel values), image attributes (e.g., attribute-value pairs describing the image), additional data (e.g., represented as attribute-value pairs, arrays, vectors, etc., corresponding to content and/or formatting of the additional data) and/or layout attributes (e.g., attribute-value pairs describing relative alignment or progressive display of image and additional data) in a structured format. As will be described below, the image data, the image attributes, the additional data and/or the layout attributes may each be provided to a calculation component 120 that enables one or more functions or calculations to be performed on the data. For example, the calculation component 120 may change the appearance of the image of the car based on particular financing incentives that are offered, whether the car is new or used, whether the car is last year's model and so on.

In some aspects, rather than the compound data type including actual data representing the image data, image attributes, additional data (including content and/or formatting attributes), and/or layout attributes, the compound data type may include an array of fields with references or pointers to the actual data, which may be stored as a record in any suitable database or otherwise. As should be appreciated, different types of additional data (e.g., chart data, video data, audio data, etc.) may be described by different sets of attribute-value pairs, or other data not represented by attribute-value pairs (e.g. an array of pixel data for instance), but may also be represented within the structured format of a compound data type.

In aspects, when a compound data type is associated with a cell, all or some portion of the data represented by the compound data type may be displayed within the cell. For example, an image (e.g., of a car) may be displayed in the same cell with additional data describing the content of the image (e.g., data depicting the year, make, model, price, etc., of the car). In some aspects, while image attributes may be included in the compound data type, the image attributes may not be displayed in the cell with the image and additional data. Rather, in aspects, image attributes may be retrieved from the compound data type and displayed upon a user selection (e.g., right click on the image). As will be described further below, UX component 122 may provide UI controls for determining how to display the image, image attributes and/or the additional data within a cell (e.g., image displayed adjacent text on left or right, image displayed above or below text, text wrapping image, text displayed over image, certain image attributes displayed, and the like) and UI controls for manipulating one or more of the image data, image attributes and/or additional data within the cell.

In a second aspect, hybrid component 118 may associate one or more images and additional data with a cell without creating a compound data type. For example, hybrid component 118 may associate one or more images as "fill" (or "background") in a cell and may allow other types of data, such as alphanumeric data, to be displayed over the one or more images in the cell. In some cases, the additional data may merely be the output of a formula (e.g., total revenue number) displayed over an image. Hybrid component 118 may also associate an image as fill for a range of cells.

For instance, a single image may fill a 4×8 range of cells (e.g., four rows by eight columns of cells), or any other range of cells. The range of cells may correspond to or be compatible with an image aspect ratio for the image, but any range of cells is possible (e.g., by adjusting the image aspect ratio, displaying only a portion of the image across the range of cells, and the like). In aspects, the image may be bound to a top left and a bottom right corner of the range of cells. When columns and/or rows of cells are inserted or deleted within the range of cells, altering the range, the image may be redrawn across the altered range of cells accordingly (e.g., based on settings for a fixed or adjustable image aspect ratio, etc.).

When an image is associated as fill for a cell or a range of cells, operations for manipulating image attributes (e.g., resolution, opacity, translucency, aspect ratio, etc.) may be provided in the same or a different user interface (UI) element (e.g., ribbon, toolbar, menu, dropdown, etc.) from operations for manipulating the additional data, such as operations for manipulating alphanumeric attributes (e.g., font type, font size, font color, font alignment, etc.) or attributes of other types of data (e.g., videos, audio files, charts, etc.).

In further aspects, hybrid component 118 may allow for adjusting a contrast between the image and the additional data within a cell or a range of cells. For example, when additional data is alphanumeric data, generally accepted contrast ratios may be fed into the calculation component 120 to optimize visibility of the alphanumeric data with respect to a background image. In aspects, hybrid component 118 may use an algorithm to target the generally accepted contrast ratios by manipulating image attributes and/or alphanumeric attributes. For example, for a darker image, contrast may be increased by altering the alphanumeric formatting attributes to a lighter font color or by altering the image attributes to increase brightness (or luminance). Alternatively, e.g., for a lighter image, contrast may be increased by altering the alphanumeric formatting attributes to a darker font color or by outlining the font in black. For an image with a red color palette, a red font color for alphanumeric data may be automatically adjusted to increase contrast, e.g., to a black font color or by outlining the red font color in black. As should be appreciated, any number of adjustments may be made to increase the contrast between the image and additional data of any type.

In some aspects, hybrid component 118 may allow for adjusting an opacity and/or translucency of an associated image to improve visibility of additional data within a cell or a range of cells. For instance, where an image is provided as background for a cell, an opacity of the image may be decreased (or a translucency may be increased) to improve visibility of the additional data (e.g., alphanumeric data) vis-à-vis the image. When opacity is decreased (or translucency is increased), the image becomes more transparent, allowing alphanumeric data to appear more crisp and visible to the human eye. In other aspects, hybrid component 118 may allow a color palette of an image to be faded such that additional data appears more visible with respect to the image.

For instance, hybrid component 118 may automatically manipulate the image attributes to adjust color fading, opacity and/or translucency by utilizing functions, calculations and/or algorithms associated with the calc engine.

Calculation component 120 may perform calculations and functions on a cells within the spreadsheet, images in the spreadsheet and compound data types within the spreadsheet. The calculation component 120 may be associated with a calc engine of the spreadsheet application. These functions or calculations may be performed on images either automatically or by user selection. For example, with reference to optimizing contrast or adjusting opacity as described above, functions or calculations may automatically be performed on attributes of an image (or attributes of additional data) by calculation component 120. Alternatively, custom processing may be performed by a user, including image processing on image data (e.g., on the array of pixels) or on image attributes (e.g., size, aspect ratio, color palette, etc.). Further although data of the image may be changed by a calculation function, in order to save processing time, the image may not actually be refreshed to the new updated image until a user requests the change is made. Thus, although the data associated with the image has changed, the appearance of the image will not change until the user requests the new image be generated. In other implementations, the appearance of the image is updated once the data is altered.

In other examples, a user may select a function that is to be applied to an image (e.g., changing the color of an image or adding a special effect) and calculation component 120 may automatically calculate and make adjustments to image attributes to perform the desired function. For example, if the color of the image was to change from a first color to a second color, pixel data for the image may be retrieved. The function would then change the pixel values of the image, or portions of the image, in order to output the desired image.

In another example, the calc engine may provide a function or calculation that automatically alters the size of an image for placement in a cell. In this example, the function may retrieve various image attributes and perform a sizing operation. For example, in order to fit the image to a cell, image attributes of height, width, aspect ratio and so on may automatically be adjusted to fit the size of the image to coincide with the size of a cell. In some examples, an image may be fit to one of a cell height (e.g., "fit vertically") or a cell width (e.g., "fit horizontally"). In some cases, options for fitting an image to a cell may be incorporated into a function for the cell. For example, a value of "0" may be associated with a "fit to cell" option, a value of "1" may be associated with a "fill cell" option, a value of "2" may be associated with a "fit horizontally" option, and a value of "3" may be associated with a "fit vertically" option. In this case, a function for an image that is "fit to cell" may be represented as: fx=IMAGE("http://www.mattspics.com/weather/rainyday.png",0). In other cases, rather than using mapped variables, short sting arguments may be provided for fitting an image to a cell or for filling a cell, e.g., "FillCell." In this case, a function for an image that "fills a cell" may be represented as: fx=IMAGE("http://www.mattspics.com/weather/rainyday.png", FillCell).

Alternatively, calculation component 120 may fit the cell to the image such that the cell conforms to an image size. In this case, cell attributes (e.g., cell height, cell width) may be automatically adjusted to coincide with a size of the image. Furthermore, in this case, other cells within a row and/or a column associated with the re-fit cell may also conform to the height and/or width dimensions of the image. As should be appreciated, the above examples are provided for purposes of explanation and should not be understood as limiting.

In additional examples, when a cell is resized, calculation component 120 may resize an image associated with the resized cell, either automatically or by a user selection. In aspects, an image may be resized to fill all or any portion of a resized cell. As should be appreciated, a cell may be resized by increasing and/or decreasing a cell height and/or by increasing and/or decreasing a cell width, either automatically or by user selection. When resizing the image, in some cases, an image aspect ratio may be fixed (or locked); and in other cases, an image aspect ratio may be adjustable. For example, when an image aspect ratio is fixed (or locked), the image may be enlarged or contracted such that an area of the image is maximized and white space is minimized within the resized cell.

In other examples, when an image aspect ratio is fixed (or locked), the image may be resized to completely fill the resized cell and one or more portions of the resized image may be cropped as necessary. In contrast, when an image aspect ratio is adjustable, the image may be resized such that the image aspect ratio coincides with a cell aspect ratio of the resized cell. In still other examples, an image aspect ratio may be partially adjustable. For example, the image may be allowed to stretch in one dimension (e.g., height) but not in another (e.g., width) when a cell is resized. As should be appreciated, the examples described above are not intended to be exhaustive and an image may be resized by any suitable means, either automatically or by user selection.

In some instances, the size of the image may be changed using a calculation function provided by the calculation component 120. For example, image metadata regarding a height and/or a width may be obtained using the functions described above. Those values may be provided to a calculation engine or otherwise be provided to a calculation function that changes one or more of the values. As a result, an updated image that is resized according to the calculation, is provided on the spreadsheet. Although altering a size of the image is specifically mentioned, other calculation functions may be performed on the image to alter its appearance. These include changing a color of the image, changing the opacity of the image, causing the image to become blurry or sharpened, causing the image to glow, or adding other special effects.

In some instances, one or more calculations may chained together. The chained calculations may be performed on cells with images and on cells without images. For example, if a first cell has a formula that depends on an image and the image is changed using a calculation function, the dependent cell (e.g., the cell that is dependent on the cell with the image) is notified and the values within the cell are recalculated accordingly. Likewise, if an image is the result of a calculation from another cell (e.g., a parent cell) and the parent cell is changed, the calculation component 120 alters the appearance of the image based on the change made to the information in the parent cell.

In some implementations, the calculation component 120 will only change the image, based on received input from a user. In other implementations, the image may be updated automatically once any data associated with the image, or with the cell the image is in, changes. For example, if data in a parent cell associated with the image is changed, the image may be updated automatically. In other implementations, the image is changed based on user initiated instructions to update the image.

In some cases, the changes in dependent cells or parent cells, or in the image itself, may be the result of a filter operation, a sort operation, a resize operation or other formatting properties of the cell. As discussed above, the calculation functions can be performed on a single image in a cell, on a single image in multiple cells, on an array of images, on a floating image on so on.

In other aspects, image attributes, image data, etc., may be surfaced in a user interface (e.g., by UX component 122) and calculation component 120 may perform operations in response to a user selection. For example, calculation component 120 may receive a selection to change a state of an image. As used herein, a "state of an image" may refer to a type of association of the image with a cell and/or spreadsheet, e.g., embedded, anchored, floating, arrayed, background, etc. Changing the state of an image may involve converting the image from one state to another, e.g., from anchored to floating, from arrayed to independent, from background to foreground, from background to independent, from embedded to floating, and the like. In performing the change in state, calculation component 120 may also perform any number functions, operations and calculations on any number of image attributes, such as adjusting an image aspect ratio, an image height, an image width, an image resolution, an image opacity, an image brightness, an image color palette, an image rotation, an image fit, and the like.

Additionally or alternatively, calculation component 120 may perform any number of operations on image data, e.g., allowing for image processing of raw pixel data. For example, the spreadsheet may surface the raw pixel data for viewing by a user. Additionally, operations may be exposed so that raw pixel data may be manipulated (e.g., by changing the R G B A values directly in the cell via a user interface or calculation function). In aspects, an array of pixel values or an array of records (e.g. a two-dimensional (2D) array of record types having four values for R, G, B, A) may be surfaced to enable a function or calculation to be performed on the values to manipulate the image data.

For example, a calculation function may be provided that changes pixels values for one or more of the R, G, B, and A values. As a result, the color of the image may change. As briefly discussed above, the change in the image color may be used to reflect certain information. In one example, the change in color could be used to show that certain sales goals for an organization or an individual has been reached.

Although specific examples are given, they are not intended to be exhaustive and any number of operations may be performed on images associated with cells by any suitable means, either automatically or by user selection. Further the change in the appearance of the image may be used for a variety of purposes.

Calculation component 120 may also analyze content of an image and return results as metadata to the image. In some cases, the analysis may be performed in conjunction with a service. For example, an image may be sent to a service for face/object recognition, which may return names of people, animals, places or things within the image. The names may then be appended to the image as metadata and surfaced for display in a user interface.

UX component 122 may communicate with calculation component 120 to provide one or more user interfaces for exposing available operations for manipulating image data and/or image attributes and/or performing one or more calculations. As used herein, the term "expose" refers to providing access for user selection and/or input. Selections and/or inputs for operations may be received by gesture, touch, mouse input, keyboard input, etc. For example, UX component 122 may provide UI controls for selecting fit and resize operations, as well as blur, sharpen and glow functions on an image. UI controls may also be provided for changing a state of an image, for example, from anchored to floating or, conversely, from floating to anchored, and the like. Additionally or alternatively, an image may be "popped out" from background to being displayed independently in a cell. Further, UI controls may be provided for manipulating image data and/or image attributes using one or more calculation functions.

For instance, UI controls may be provided for manipulating image data, e.g., for performing image processing, etc., and UI controls may be provided for manipulating image or selecting a function that is applied to attributes of the image (e.g., adjusting height, width, aspect ratio, resolution, color palette, and the like). For example, a calculation function may be used to change the color of an image as sales data in another cell is updated and/or changed. The new updated image is then provided in the spreadsheet. As should be appreciated, UX component 122 may provide any number of user interfaces (e.g., dropdown menus, popup menus, ribbons, toolbars, etc.) for exposing operations to manipulate image data and/or image attributes.

For cells associated with more complex objects, e.g., an array of images or one or more images with additional data, UX component 122 may provide additional functionality and UI controls. For instance, UI controls may be provided for selecting a layout (or alignment) between an image and additional data within a single cell and/or between multiple images within a single cell, e.g., an image may be displayed above, below, to the right or left of, or wrapped by additional data, etc. Image data and/or image properties may be adjusted accordingly based on the layout selection by feeding image data and/or image properties into appropriate algorithms associated with the calc engine. Additionally, UX component 122 may display various views of data associated with a compound data type, e.g., display of data may vary based on cell size and/or various user interfaces may be provided. For instance, a minimal amount of data may be displayed in a small cell (e.g., an icon representation of the image), but successively more data may be displayed as the cell is enlarged (e.g., rendered image, image name, additional data about the content of the image, various image attributes, etc.). Each of these "resizing" features may be governed by calculations associated with the calc engine. As should be appreciated, UX component 122 may retrieve and surface more or less data associated with a compound data type based on user preference or selection.

Similarly, where multiple images are associated with a single cell, UX component 122 may provide a UI element for displaying an array of images. For example, in a default collapsed view (e.g., collapsed UI element), less than the full array of images may be displayed within the cell. In some aspects, in the collapsed view, UX component 122 may provide a timer to cycle display of each image within the cell. The collapsed UI element may further include a visual indication that multiple images are associated with the cell (e.g., a stack indicator, scroll control, etc.). In response to selection of a UI control (e.g., right click, button, menu, etc.), the collapsed view may expand to reveal the full array of images. Images may be displayed within an expanded UI element in any suitable arrangement (e.g., linear, carousel, grid, etc.) for viewing and interacting with the array of images. For instance, an image may be selected and removed from the array of images associated with a first cell and cut/pasted or drag/dropped into a second cell, or an image may be deleted from the array altogether. In some cases, the whole array may be "spilled" into a range of cells, e.g., with each image spilling into (or being associated with) a different cell of the range of cells. Additionally, a new image may be added to an array images by opening the expanded UI element (e.g., by right click activation) and by inserting the new image into a selected position within the array. As detailed above, any number of different user interfaces may be provided by UX component 122 for viewing and/or manipulating image data, image attributes and/or additional data.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
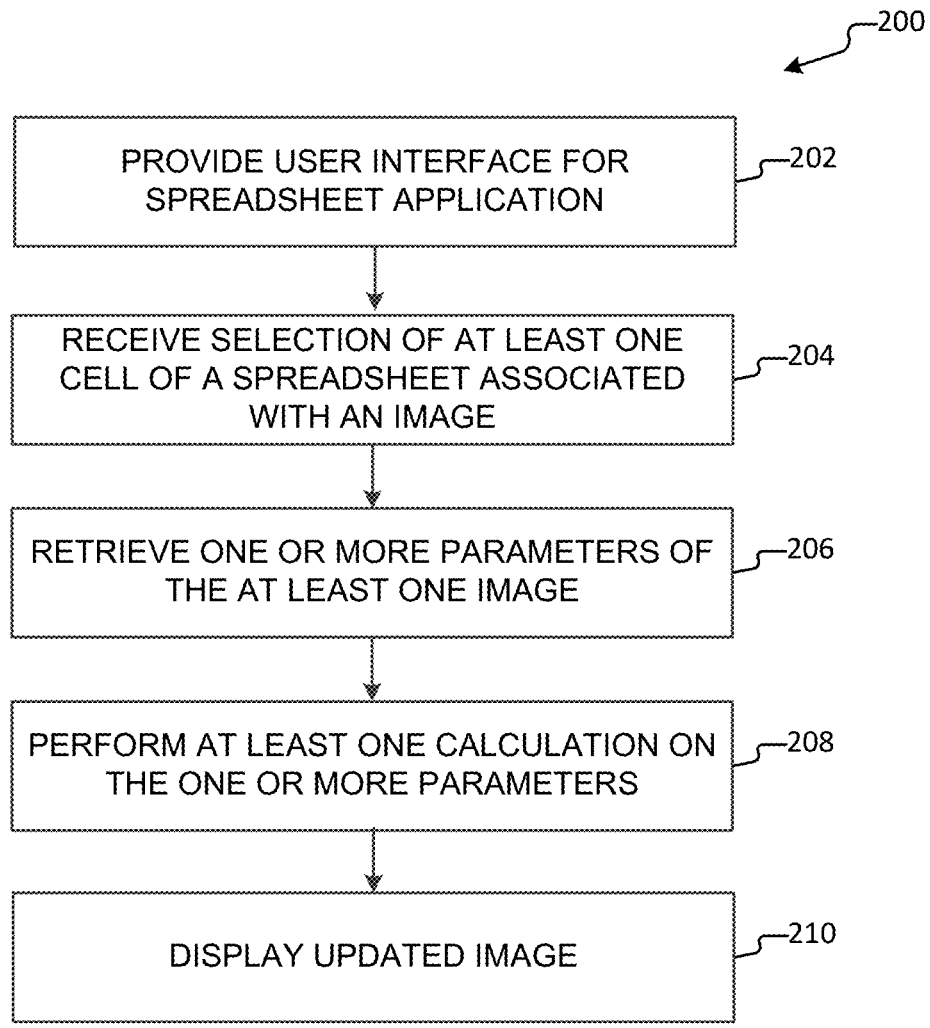
FIG. 2 illustrates a method for updating an image in a spreadsheet using one or more calculation functions, according to an example embodiment.

FIG. 2 illustrates a method for updating images contained within a cell or otherwise associated with a cell in a spreadsheet, according to an example embodiment.

Method 200 begins with provide interface operation 202, where a spreadsheet application may provide (or cause to be provided) a user interface to a user. For example, a UX component (e.g., UX component 122) may facilitate a user experience (UX) by providing the user interface of a spreadsheet application (e.g., spreadsheet application 110) via a display. Selections and/or inputs may be received by the user interface based on gestures, touch, mouse movements, and the like. The user interface may operate in conjunction or communication with one or more other components of the spreadsheet application (e.g., associate component 112, array component 114, attribute component 116, hybrid component 118, and calculation component 120) to associate one or more images with one or more cells of the spreadsheet.

Flow then proceeds to operation 204 in which a cell that is associated with the image is selected. In some embodiments, the image may be embedded or otherwise contained within one cell or multiple cells. In another embodiment, the image may be a floating image but is otherwise associated with one or more cells such as described above.

Cells may be selected by highlighting or otherwise identifying the cell or range of cells using a gesture, touch, mouse click, keyboard input, and the like. When a single cell is selected, the cell may be identified in a toolbar of the user interface by a cell identifier that specifies a location of the cell within the spreadsheet. For example, a cell identifier of "A1" specifies that the cell is located in column A, row 1 of the spreadsheet, while a cell identifier of "B5" specifies that the cell located in column B, row 5 of the spreadsheet. The cell identifier may further be displayed adjacent to a formula bar (or "fx bar") identifying the contents of the cell in the toolbar of the user interface. When a range of cells is selected, the cell at the top left corner of the range may be displayed by a cell identifier next to the formula bar, with the range of cells being represented by a range identifier including cell identifiers for the cell at the top left corner and the cell at the bottom right corner (e.g., A1:C5).

Once an image or cell is selected, flow proceeds to operation 206 in which image data and/or image attributes (collectively "parameters") may be retrieved for the image associated with the selected cell. Retrieve parameters operation 206 may be performed by an attribute component (e.g., attribute component 116) of a spreadsheet application (e.g., spreadsheet application 110). In some aspects, image data may be retrieved from an image file and image attributes may be retrieved from metadata appended to the image file. In other aspects, parameters (e.g., image data, image attributes, additional data, pixel data, formatting attributes, etc.) may be retrieved from a data structure of a compound data type. As should be appreciated, once an image is associated with the selected cell, any number of parameters may be retrieved for the associated image. In at least some aspects, the retrieved parameters may further be surfaced in a user interface or otherwise for manipulation by a user.

For example and as discussed above, various functions may be used to obtain parameters of the image. In one instance, the pixel data may be retrieved or otherwise accessed using a function "=ImagePixelData ( )." This function may return a 2D array or a 3D array of all pixel information in an image or compound data type. In other implementations, a dot "." operator may be used to access the pixel data, or specified portions of pixel data such as described above. In further examples, an ImageLocation ( ) may be used to access coordinates of the captured image, a dot "." operator may also be used to access certain portions of data within the image or compound data type. In yet another example, a function "=ImageMetaData ("parameters")" may be used to specify which portions of the metadata should be accessed.

At perform calculation 208, at least one calculation may be enabled or otherwise performed on one or more parameters of the image. In aspects, the calculation may be performed by a calculation component (e.g., calculation component 120) of a spreadsheet application (e.g., spreadsheet application 110). In some instances, the calculation component 120 may have an associated calculation engine that executes one or more calculations on the retrieved data.

As discussed above, the calculation may alter the parameters of the image. As a result, a new image may be generated. In some instances, the calculation is performed in response to one or more conditions being met. For example, data in the spreadsheet indicates that certain sales goals have been met, a calculation may automatically be performed on the image to change a color of the image, add a special effect to the image and so on.

In other implementations, one or more calculations may be performed in response to the one or more images meeting certain criteria. For example, a calculation or function may be invoked when the image has certain properties. Continuing with the example above, when the image has changed color due to certain sales goals being met, another calculation (e.g., a resize calculation or function) that is dependent on the image changing color may be triggered.

In addition to the various calculation functions, a user interface may provide options for sizing the image and/or for sizing the selected cell. For example, a user may select an option for fitting the image to a size of the cell or for fitting the selected cell to the size of the image. In some cases, by default, the size of a cell (e.g., as defined by a cell height and a cell width) may automatically be fit to the size of an associated image. In response to fitting the size of the selected cell to the image, sizes of additional cells within a row and/or a column associated with the selected cell may also be adjusted.

As should be appreciated, other operations for sizing or fitting images to cells (or cells to images) are possible. For instance, the sizes of both a cell and an associated image may be fit such that the image is of appropriate size to be viewed by a user, but not so large so as to prevent other data (e.g., rows and columns) from being displayed within the spreadsheet.

Additionally, where multiple images are associated with a cell, or multiple images are associated with different cells within a row and/or a column of the spreadsheet, the cells within the row and/or the column may be fit to the image having the largest height and/or the image having the largest width (which may not necessarily involve the same image where sizes and/or aspect ratios of the images differ). Additionally, options may be provided for resizing an image when a cell is resized, for displaying more or less data of a compound data type when a cell is resized, and the like.

As should be appreciated, at perform calculation 208, additional calculations or operations may also be performed. For example, the state of an image may be changed (e.g., from anchored to floating, from background to foreground, from background to independent, from embedded to floating, from arrayed to spilled, from floating to anchored, and the like). Options may also be provided for customizing various image attributes. For instance, calculations may be performed for manipulating image attributes such as height, width, aspect ratio, resolution, and the like. In some instances, one or more calculation functions may also be executed on the image to change or otherwise alter the attributes of the image. For example, the pixel data may be changed to give a variety of special effects to the image such as a glow effect, a sharpen effect, a blur effect and so on.

More specifically, when the pixel data, image metadata or other parameters of the image are retrieved from operation 206, a calculation may be performed on the data. The calculation may be dependent on values contained in one or more cells of the spreadsheet application. As each cell is selected and the calculation is performed on those values and on the parameters associated with the image, a new image (or an updated image) may be provided on the spreadsheet application.

Perform calculation 208 may further enable spreadsheet operations and calculation functions to be performed based on image attributes and/or content attributes of the at least one image associated with the selected cell. As discussed above the range of cells may be selected for various calculation functions. As the calculation function may change data associated with the image, the appearance of the image may change.

In some instances, various calculation functions may be chained together. The chained calculations may be performed on cells with images and on cells without images. For example, if a first cell has a formula that depends on an image and the image is changed using a calculation function, the dependent cell (e.g., the cell that is dependent on the cell with the image) is notified and the values within the cell are recalculated accordingly. Likewise, if an image is the result of a calculation from another cell (e.g., a parent cell) and the parent cell is changed, the calculation component alters the appearance of the image based on the change made to the information in the parent cell.

In another embodiment, a new image, with the updated parameters, may be generated. As should be appreciated, any number of operations performed on the spreadsheet may be performed based on image attributes of the associated image.

At operation 210 the updated image may be provided on the spreadsheet application or otherwise output for display. In some instances, the updated image may be provided by a UX component (e.g., UX component 122) of a spreadsheet application (e.g., spreadsheet application 110). Once the new image is displayed, additional calculations and functions may be applied to the new image in a similar manner as described above.

In some implementations, the spreadsheet application may display a plurality of images. These include updated images (e.g., images on which calculation functions were applied) original images and so on. The plurality of images may be selected for association to a particular cell. This option to do so may be provided on a popup menu or may be provided in a toolbar, ribbon, or otherwise, within the user interface.

In some aspects, display options for the plurality of images may be provided in the user interface. For instance, options for displaying the plurality of images in various configurations (e.g., linear, carousel, grid, etc.) may be provided. In some cases, while the plurality of images may be associated with a single cell, display of the plurality of images may overlay additional cells of the spreadsheet. For example, in a linear configuration, the plurality of images may be displayed horizontally (e.g., overlaying portions of a row or rows adjacent to or near the associated cell(s)) or may be displayed vertically (e.g., overlaying portions of a column or columns adjacent to or near the associated cell(s)). In a grid or carousel configuration, the plurality of images may overlay portions of a block of cells (e.g., including both rows and columns) adjacent to or near the associated cell(s). As should be appreciated, other configurations for displaying a plurality of images are possible.

In further aspects, display operation 216, may also enable the user to display, interact with and/or manipulate the plurality of images. For example, the UI element may enable a collapsed view and an expanded view of the plurality of images. In the collapsed view (collapsed UI element), less than all of the plurality of images (e.g., one image, two images, or other suitable number) may be displayed within the selected cell at any one time. The collapsed view may further provide a visual indication that multiple images are associated with the selected cell (e.g., a stack indicator, scroll control, etc.).

In some aspects, the collapsed UI element may further include a timer such that display of each image of the plurality of images may cycle within the selected cell. To switch to an expanded view, a UI control may be selected (e.g., by right click, button, menu, etc.) and the collapsed view may expand to reveal all of the plurality of images. In the expanded view, the plurality of images may be displayed in any suitable arrangement (e.g., linear, carousel, grid, etc.) and may overlay additional cells of the spreadsheet for viewing and interacting with the plurality of images.

A user may interact with the expanded view by translating through the plurality of images to view, add, delete, edit, or otherwise manipulate images within the array. In some aspects, a control may be provided for "playing" the plurality of images as a slideshow. The slideshow may be used to show how the calculation function altered the appearance of a particular image over time. In this regard, further controls may be provided for animating display of the plurality of images, e.g., fade-out, fade-in, perceived three-dimensional pop-out display, etc.

As should be appreciated, operations 202-210 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
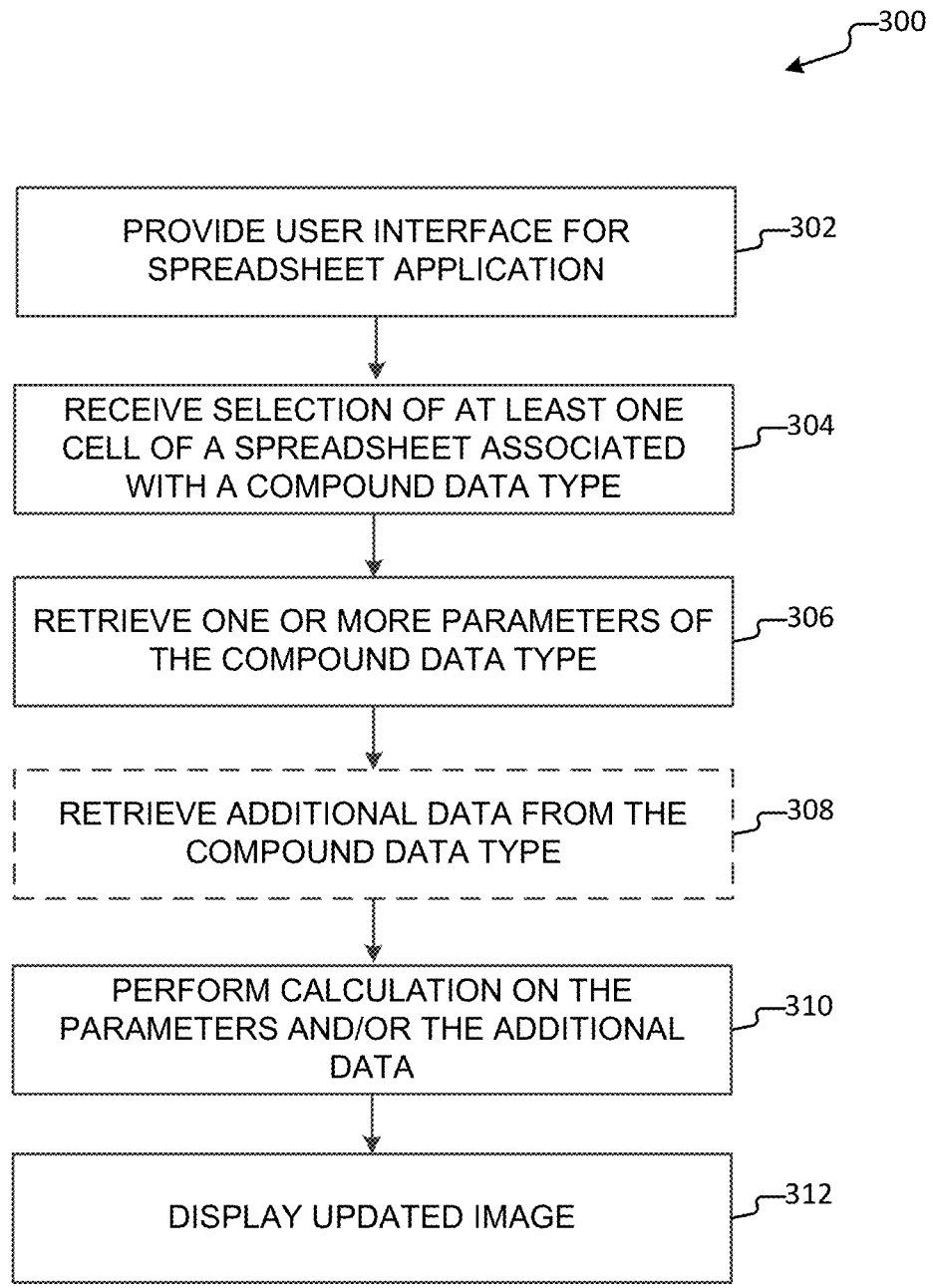
FIG. 3 illustrates a method for performing calculations on data within a compound data type associated with a cell of a spreadsheet, according to an example embodiment.

FIG. 3 illustrates a method for performing calculations on data within a compound data type associated with a cell of a spreadsheet, according to an example embodiment. As noted above, a compound data type may include an image and additional data. In some cases, the additional data may include content attributes (which may be described in terms of attribute-value pairs) and may be defined by formatting attributes (which may also be described in terms of attribute-value pairs). The compound data type may also include image attributes that may be represented in terms of attribute-value pairs. Thus, the compound data type may include image data (e.g., an array of pixel values) with image attributes (e.g., described by attribute-value pairs), additional data (e.g., including content attributes and/or formatting attributes described by attribute-value pairs) and/or layout attributes (e.g., described in terms of attribute-value pairs) in a structured format. In some aspects, the compound data type may not include actual data representing one or more of the image data, image attributes, additional data and/or layout attributes, but the compound data type may include an array of fields with references or pointers to the actual data, which may be stored as a record in any suitable database or otherwise. As should be appreciated, different types of data (e.g., chart data, video data, audio data, etc.) may be described by different sets of attribute-value pairs, but may also be represented within the structured format of a compound data type.

Method 300 begins with provide interface operation 302, where a spreadsheet application may provide (or cause to be provided) a user interface to a user. For example, similar to provide interface operation 202, a UX component may facilitate a user experience (UX) by providing a user interface (UI) of a spreadsheet application via a display. Selections and/or inputs may be received by the user interface based on gestures, touch, mouse movements, keyboard input, and the like. Additionally, the user interface may operate in conjunction or communication with one or more other components of the spreadsheet application (e.g., associate component 112, array component 114, attribute component 116, hybrid component 118, and calculation component 120) to associate one or more images with one or more cells of the spreadsheet.

Flow then proceeds to operation 304 in which a cell associated with a compound data type is selected. This selection may be similar to the selection described above with respect to operation 204. For example, at least one cell may be selected, either automatically (e.g., based on a function) or by user selection. In some aspects, a calculation may call (or select) a cell without requiring user input. For example, a calculation may automatically import an image or compound data type from another data source.

Cells may also be selected by highlighting or otherwise identifying the cell or range of cells using a gesture, touch, mouse click, keyboard input, and the like. For instance, when a single cell is selected, the cell may be identified in a toolbar of the user interface by a cell identifier that specifies a location of the cell within the spreadsheet. The cell identifier may further be displayed adjacent to a formula bar (or "fx bar") identifying the contents of the cell. Alternatively, when a range of cells is selected, the cell at the top left corner of the range may be displayed by a cell identifier next to the formula bar, with the range of cells being represented by a range identifier including the cell identifiers for the cell at the top left corner and the cell at the bottom right corner.

Flow then proceeds to operation 306 and one or more parameters of the compound data type are retrieved. In some embodiments, the parameters of the image associated with the compound data type are retrieved using various functions such as those described above.

Flow then optionally proceeds to operation 308 (shown by dashed lines) and additional data associated with the compound data type may be retrieved. As described above, the additional data may describe or be related to the content of the at least one image and may be represented by attribute-value pairs (e.g., content attributes). For instance, referring back to the example image of the car, additional data may include attribute-value pairs such as "year—2015"; "make—BMW"; "model—Z4"; etc. As well, the additional data may be described by formatting attribute-value pairs such as "font size—11 pt."; "font color—red"; "font—Calibri"; "decimals—2"; "currency—Y"; etc.

In other aspects, the additional data may not necessarily be represented by attribute-value pairs. For instance, the additional data may be a single numeric value that is the output of a formula (e.g., total revenue value, sum of a range of cell values, average value over a range of cell values, etc.). In still other aspects, additional data can be represented as arrays or vectors of data as well as any other primitive type (strings, numbers, etc.). Additionally, layout attributes may define a relative arrangement and/or dynamic display of image data, image attributes and additional data. For instance, layout attributes may also be defined by attribute-value pairs, e.g., "alignment—top" or "progressive display—1", etc.

Flow then proceeds to operation 310 in which one or more calculations are performed on the retrieved data. As described above, the calculation may be performed by a calculation component (e.g., calculation component 120) of a spreadsheet application (e.g., spreadsheet application 110). In some instances, the calculation component 120 may have an associated calculation engine that executes one or more calculations on the retrieved data.

The performed calculation may alter the parameters of the image associated with the compound data type as well as the parameters of the additional data (if retrieved) such as described above. As a result, a new image and/or new background images may be generated.

As also described above, the calculation may be performed on the compound data type and its associated data in response to one or more conditions being met. In other implementations, one or more calculations may be performed in response to the image, the additional data or the compound data type meeting certain criteria.

Additional calculations or operations may also be performed in operation 310. For example, the state of compound data type may change (e.g., from anchored to floating etc.). Options may also be provided for customizing various image attributes and the additional data such as described above.

The calculation operation 310 may further enable spreadsheet operations and calculation functions to be performed on a range of cells, on multiple images, on multiple compound data types and so on. As such, various calculation functions may be chained together.

At display operation 312, the additional data and the updated image may be displayed. For example, as described above, when the at least one image is associated as fill (or background) for a cell or a range of cells, the additional data may be displayed over the at least one image. In some cases, a contrast between the at least one image and the additional data may be manipulated to optimize visibility of the additional data, either automatically (e.g., as a result of the calculation function) or by user selection. Alternatively, an opacity and/or translucency of the image may be manipulated to optimize visibility of the additional data. When the at least one image is not associated as fill for the selected cell, the additional data and the at least one image may be arranged within the cell in any suitable alignment or layout. For example, the additional data may be displayed adjacent to the at least one image on the left or right, displayed above or below the image, wrapping the image, and the like. As should be appreciated, the additional data and the at least one image may be displayed according to any suitable alignment or layout, either automatically or based on user selection.

Additionally, at display operation 316, the image and the additional data may be fit to the cell size or the selected cell may be fit to a size appropriate for the image and the additional data. In some cases, the amount of data associated with the compound data type that is displayed may be based on the cell size, and as a cell is resized, the amount of data displayed may dynamically change. Alternatively, the image and the additional data may be allowed to overlay additional cells of the spreadsheet. The above examples are provided for purposes of explanation only and should not be understood as limiting.

As should be appreciated, operations 302-310 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
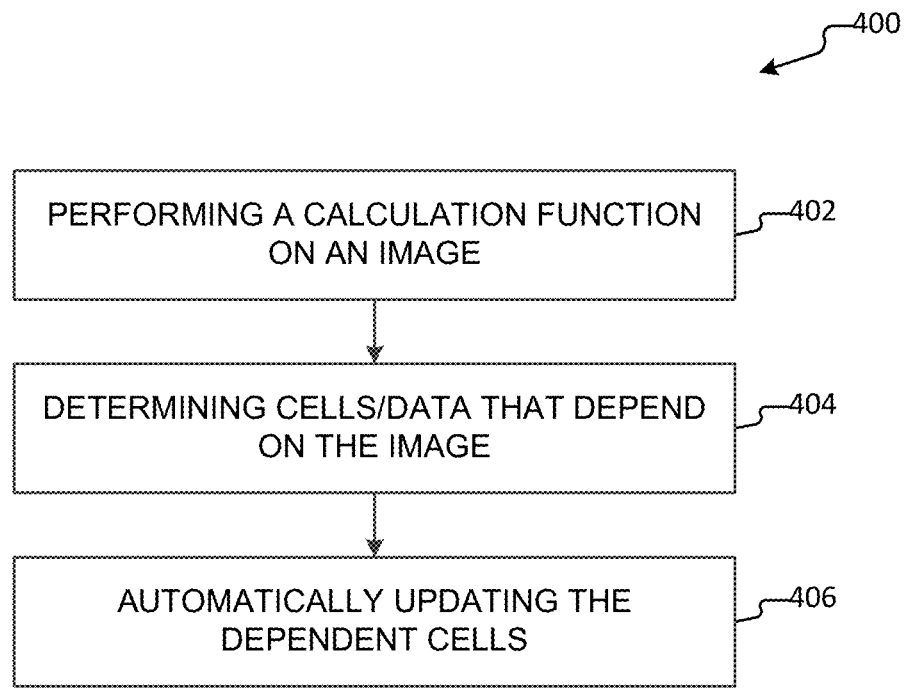
FIG. 4 illustrates a method for updating dependent cells in a spreadsheet when an image is updated, according to an example embodiment.

FIG. 4 illustrates a method for automatically updating spreadsheet data in response to an image being updated. In some instances, the method 400 described below may be performed after the method 200 and method 300 described above are performed. Further, although method 400 described updating spreadsheet data in response to an image being updated, it is also contemplated that an image may be automatically updated using a calculation function when data in other cells of the spreadsheet is updated.

Method 400 begins at operation 402 in which a calculation function is performed on an image. As discussed above, the calculation function may be used to alter the appearance of an image, add a special effect to an image and so on.

Once the calculation on the image has been performed, flow proceeds to operation 404 and a determination is made as to which cells in the spreadsheet, if any, depend from or are otherwise associated with the image or the cell that is associated with the image. That is, a determination is made as to whether any cells in the spreadsheet application have a dependency on the image or the cell associated with the image.

If dependencies are determined, flow proceeds to operation 406 and the data in the dependent cells is updated. The data in the dependent cells may be updated using one or more functions, operations, and/or calculations. In some embodiments, the dependent cell may have an image or compound data type. In such cases, the appearance of the image in the dependent cell may also be updated such as described above.

As should be appreciated, operations 402-406 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Although the above-described embodiments and associated figures are directed to images, the system 100 and the methods 200-400 may also be used to process video and other streaming content in a spreadsheet application. For example, video content, like images, may be a native part of the spreadsheet application. As such, one or more calculation functions may be performed or otherwise executed on the video content to manipulate the video content, edit the video content and so on.

For example, video content may contain metadata. One or more spreadsheet functions or calculations may be used to obtain the metadata information. Once the metadata is received, various calculations may be performed on the metadata and/or on the video content itself to alter, update or otherwise analyze the frames and other content of the video content.

As with images described above, video content can be embedded in a cell or can float on top of the grid such as described above. Further, the video files can be resized based on a width and height of the cell. Calculation functions can be executed on the video file regardless of whether it is floating or embedded in a cell of the spreadsheet.

In some embodiments, the calculation functions may alter the appearance of the video content. For example a "Sum" function or calculation can append a first video content to a second video content, a "Subtraction" calculation or function may provide a difference in running time of the first video content and the second video content. Additionally, functions may be provided that alter the playback features of the video content. This includes a volume of the video content, a speed of playback, a direction of playback, a brightness or image quality of the playback and so on.

In addition, the functions or calculations may also alter the video content itself. For example, a calculation may remove or add frames from the video content, transcribe the audio of the video content, remove or add speech and/or music, alter the duration of the video content, return timestamps of various frames of the video content and so on.

In some embodiments, editing or changing of the video content may be based on various criteria being met. For example, certain frames of a video content may be automatically played when certain conditions are met. In another example, a first video may be played back when a first set of conditions are met and a second, different video (or a different portion of the first video) may be played back when a second set of conditions are met. Further, playback features of the video content may be altered or changed based on these conditions. In other aspects, new frames may be inserted, subtitles may be shown on different portions or frames of the video content and so on.

In other examples, the video content may be edited to show various types of information at certain points in the playback. For example, various financial numbers may be concurrently displayed at certain points of the video content.

Embodiments of the present disclosure also enable the video content to be read by various functions during playback. Accordingly, a filter that is applied to the video content may be changed in real time or substantially real time and/or based on what is happening during playback. In other implementations, instead of altering the playback in real time, the metadata of the video content being played back may be altered such that the next time the video content is played, the playback is altered based on the updated metadata.

As discussed above, the various playback features of the video content may be altered. This may be done in real time or substantially real time. In other implementations, a calculation function may be used to step through the video content a frame at a time. Each frame may then be subject to one or more additional calculation functions.

In some implementations, facial recognition, object recognition, audio recognition and the like may be performed on the video content using various functions of the spreadsheet application. In some embodiments, if a calculation function is being performed on the video content and the processing is taking a long time to complete, another calculation function may be used to slow down the playback of the video content. Further, various calculation functions may be chained together to perform multiple changes to the video content. As such, in depth analysis may be performed on the video content. For example, various calculation functions may be chained together analyze all frames of a video in which a person, product, category and the like is provided in the video content.

Other processing and editing of the video content may include, but is not limited to, extracting audio and/or a soundtrack from the video content, merging sound into the video content, adding comments to certain frames of the video content and so on. Further, one or more calculation functions may be used to extract certain frames or a certain number of frames from the video content that includes certain features, sounds, images and so on.

In yet another implementation, the video content may be provided to a third party service which may return the video content as a structured data. The video content may also be part of or otherwise associated with a compound data type such as described above.

Although specific examples are given, the video content may be edited in any number of ways using various calculation functions. When edited, the spreadsheet application may generate a copy of the original video content. In other embodiments, the edited video content may replace the original video content in the cell.

Figure 6A:
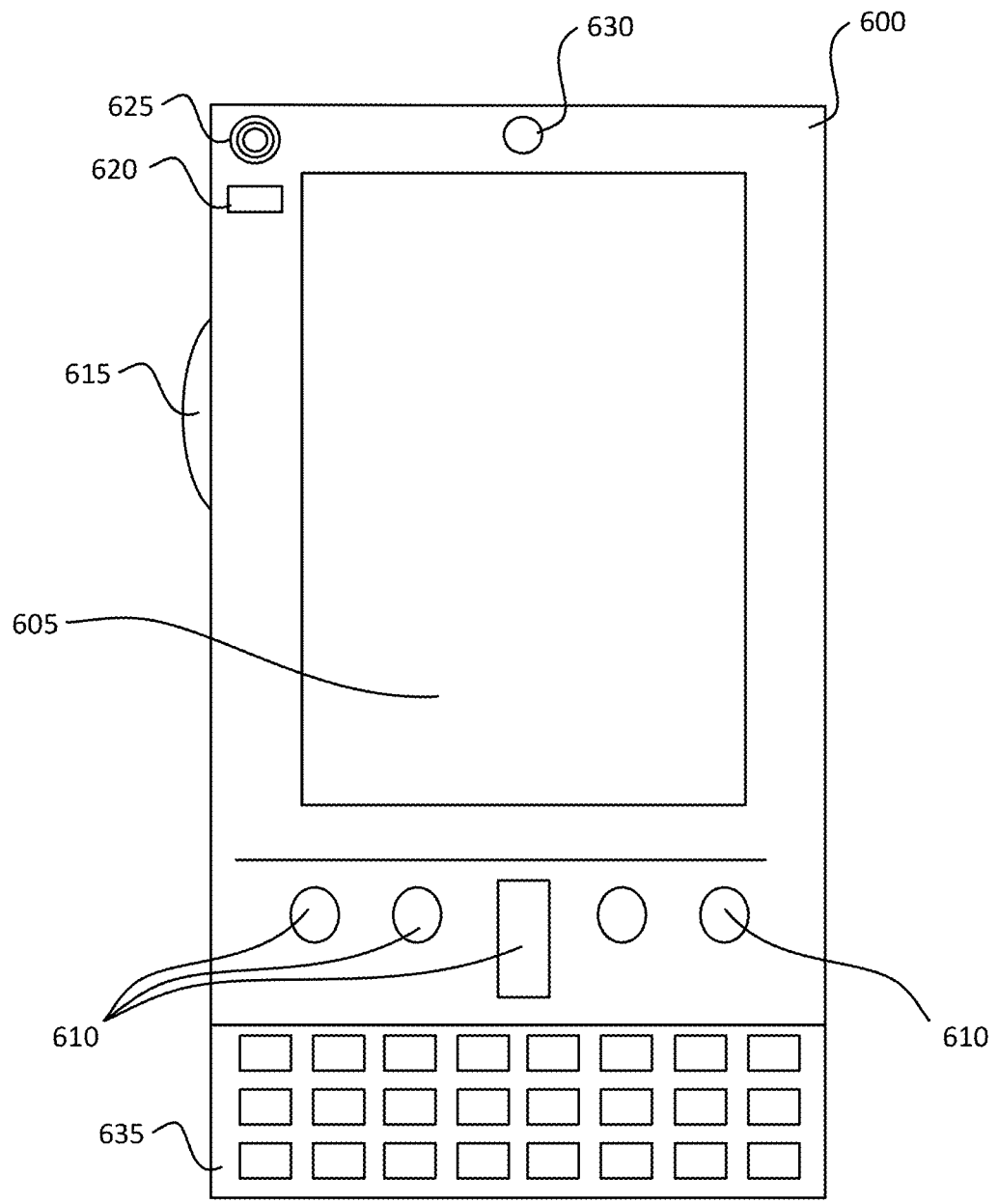
FIGS. 6A and 6B are simplified block diagrams of a mobile computing device with which aspects of the present disclosure may be practiced.
Figure 6B:
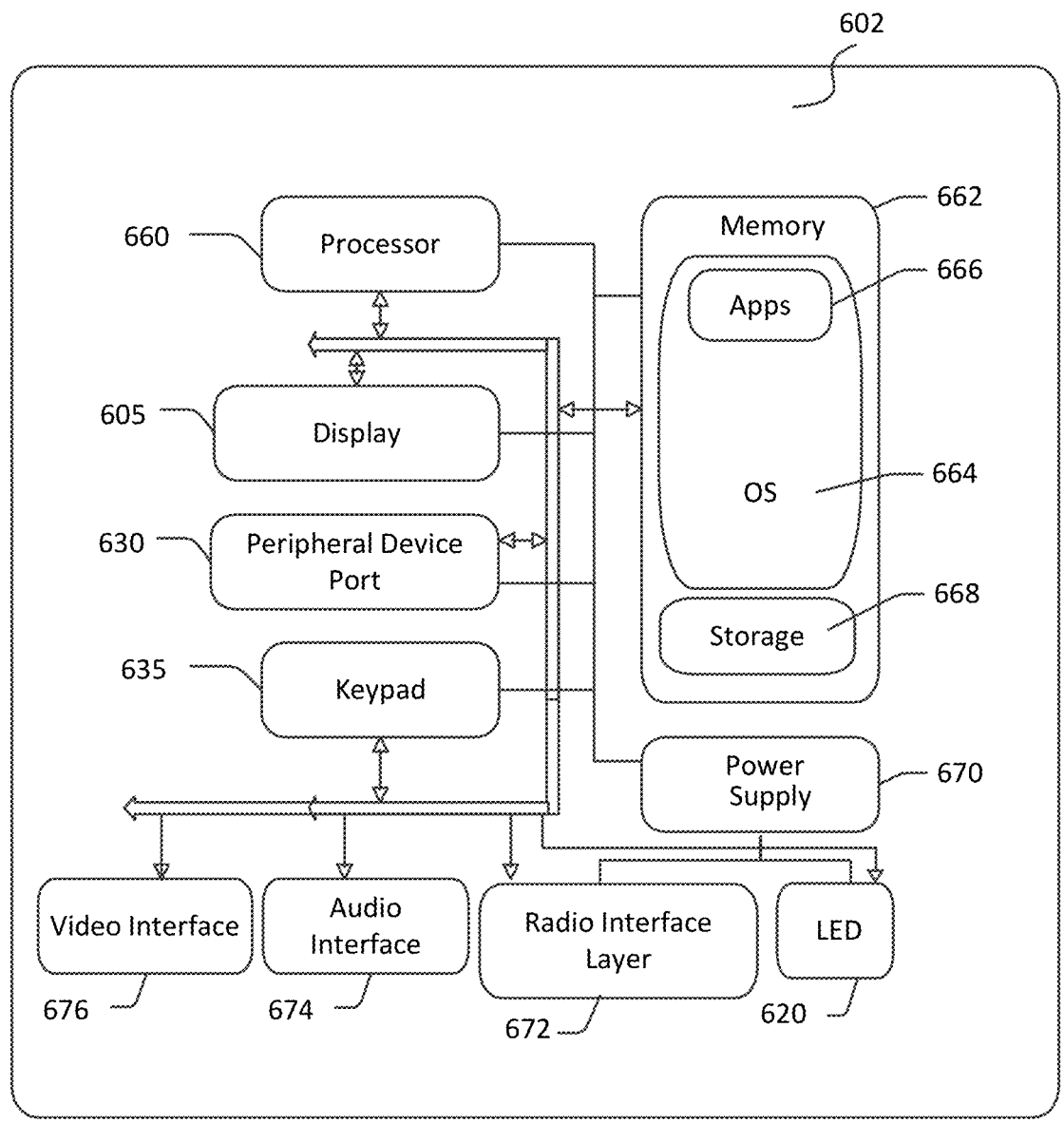
Figure 7:
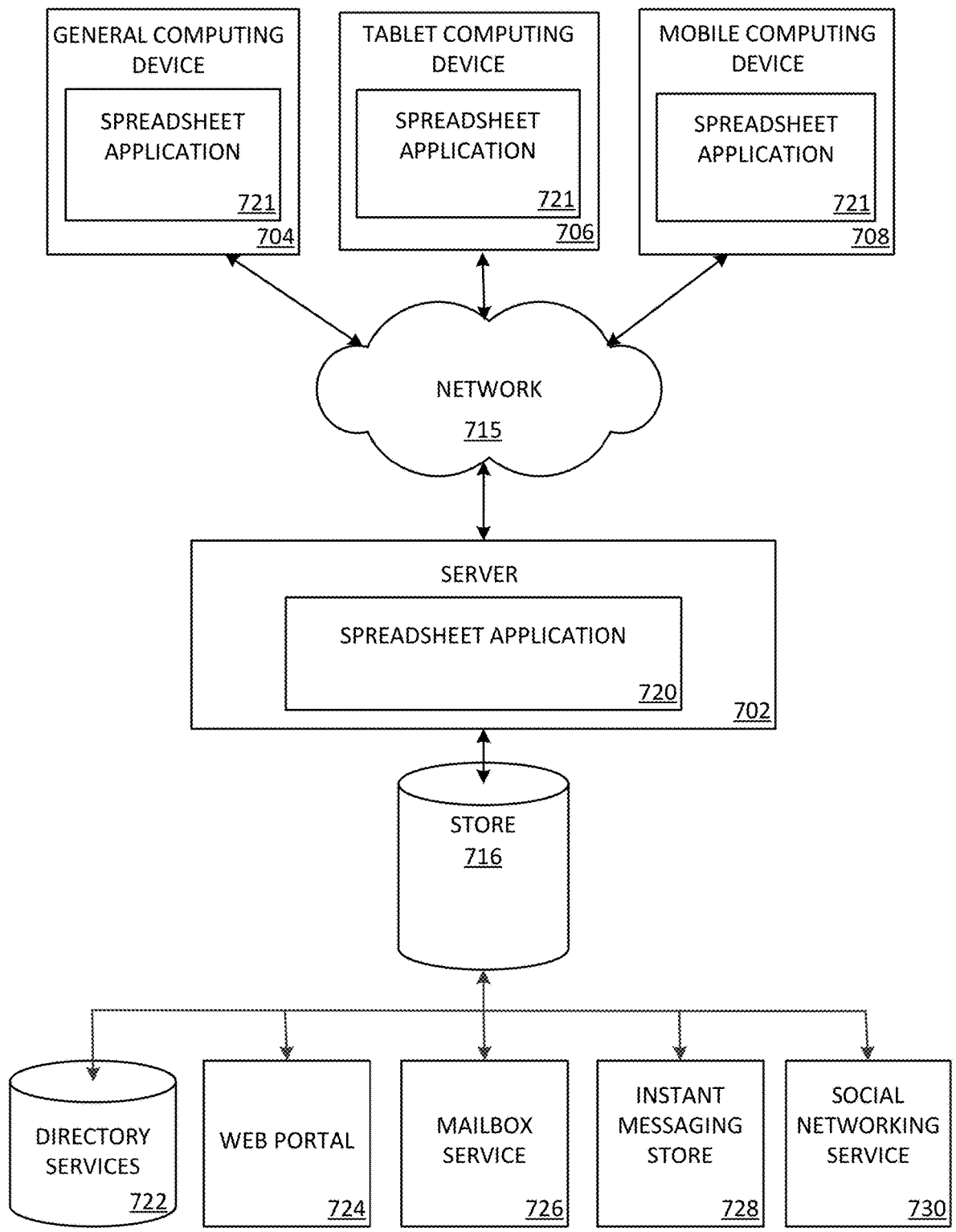
FIG. 7 is a simplified block diagram of a distributed computing system in which aspects of the present disclosure may be practiced.
Figure 8:
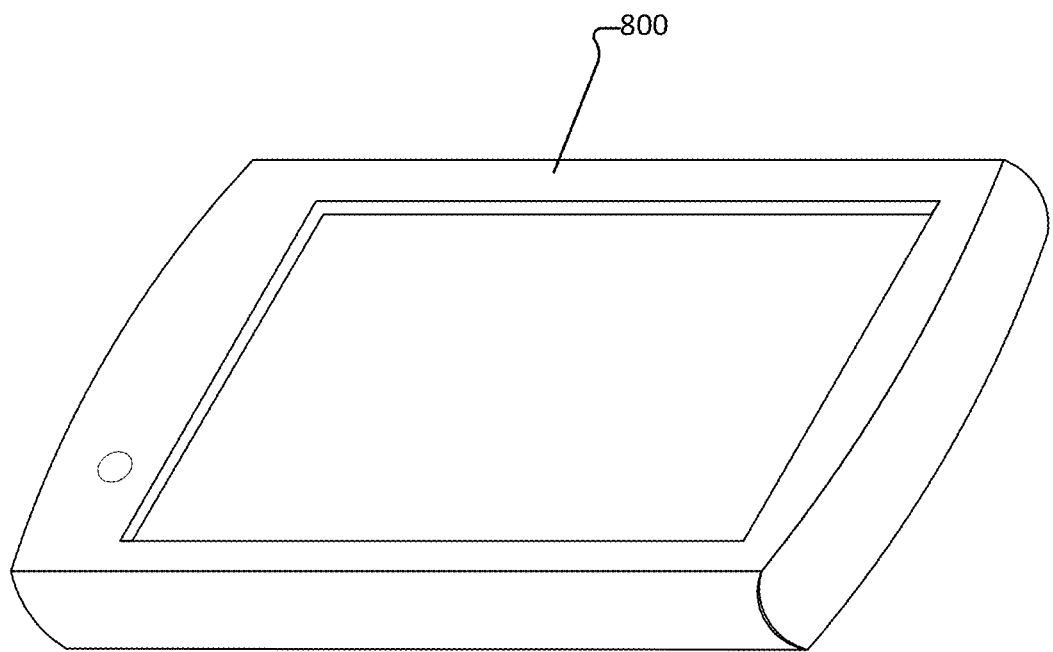
FIG. 8 illustrates a tablet computing device for executing one or more aspects of the present disclosure.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure, as described herein.

Figure 5:
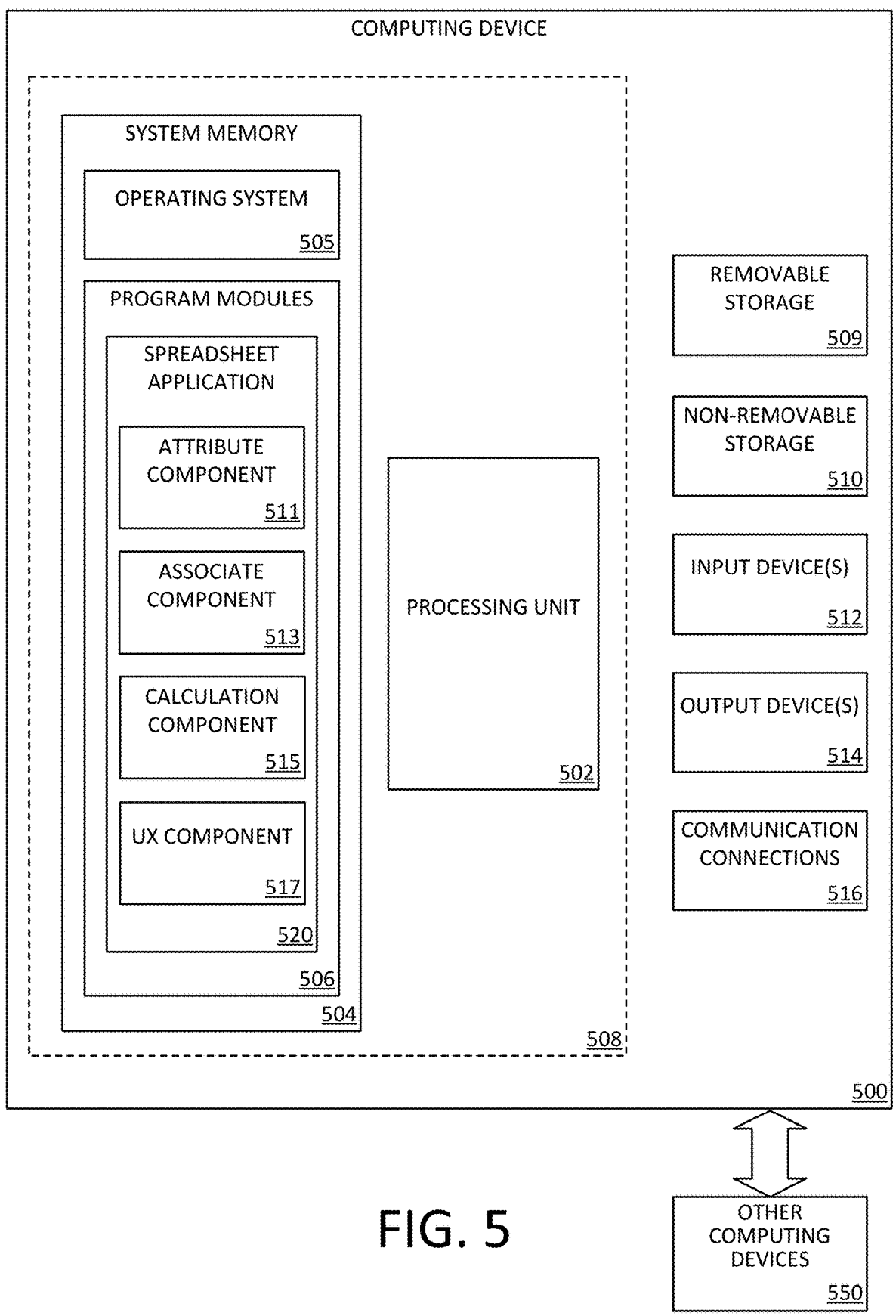
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may have computer executable instructions for implementing a spreadsheet application 520 on a computing device (e.g., server computing device 108 and/or client computing device 104), including computer executable instructions for spreadsheet application 520 that can be executed to implement the methods disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running spreadsheet application 520, such as one or more components with regard to FIG. 1 and, in particular, attribute component 511 (e.g., corresponding to attribute component 116), associate component 513 (e.g., including associate component 112, array component 114, and hybrid component 118), calculation component 515 (e.g., corresponding to calculation component 120), and/or UX component 517 (e.g., corresponding to UX component 122).

The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., spreadsheet application 520) may perform processes including, but not limited to, the aspects, as described herein. Other program modules that may be used in accordance with aspects of the present disclosure, and in particular for associating images with cells of a spreadsheet, may include attribute component 511, associate component 513, calculation component 515, and/or UX component 517, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as email or other messages used by an email application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the instructions for associating one or more images with one or more cells of a spreadsheet as described herein (e.g., attribute component, associate component, array component, hybrid component, calculation component, and/or UX component, etc.).

The system 602 has a power supply 670, which may be implemented as one or more batteries. The power supply 670 may further include an external power source, such as an AC adapter or a powered docking cradle that supplements or recharges the batteries. The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via an audio transducer 625 (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of peripheral device 630 (e.g., on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

As should be appreciated, FIGS. 6A and 6B are described for purposes of illustrating the present methods and systems and are not intended to limit the disclosure to a particular sequence of steps or a particular combination of hardware or software components.

FIG. 7 illustrates one aspect of the architecture of a system for processing data received at a computing system from a remote source, such as a general computing device 704 (e.g., personal computer), tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking service 730. The spreadsheet application 721 may be employed by a client that communicates with server device 702, and/or the spreadsheet application 720 may be employed by server device 702. The server device 702 may provide data to and from a client computing device such as a general computing device 704, a tablet computing device 706 and/or a mobile computing device 708 (e.g., a smart phone) through a network 715. By way of example, the computer system described above with respect to FIGS. 1-9 may be embodied in a general computing device 704 (e.g., personal computer), a tablet computing device 706 and/or a mobile computing device 708 (e.g., a smart phone). Any of these embodiments of the computing devices may obtain content from the store 716, in addition to receiving graphical data useable to either be pre-processed at a graphic-originating system or post-processed at a receiving computing system.

As should be appreciated, FIG. 7 is described for purposes of illustrating the present methods and systems and is not intended to limit the disclosure to a particular sequence of steps or a particular combination of hardware or software components.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 8 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer executable instructions that, when executed by the at least one processing unit, causes the system to perform operations of:
      associating an image with a spreadsheet cell;
      rendering the image in the spreadsheet cell using a display property having a numeric value;
      using a function of a spreadsheet application to obtain the numeric value of the display property from data of the image associated with the spreadsheet cell;
      changing, using a calculation function of the spreadsheet application and data obtained from another spreadsheet cell, the numeric value of the display property, wherein the calculation function comprises one or more of a blur function, a sharpen function and a glow function; and
      providing, for display in the spreadsheet cell, the image with the display property modified based on the changed numeric value.

2. The system of claim 1, wherein the data of the image includes image data and image metadata, and the numeric value of the display property is obtained from the image metadata associated with the image.

3. The system of claim 1, wherein the data of the image includes pixel information, and the numeric value of the display property is obtained from the pixel information associated with the image.

4. The system of claim 1, wherein the image is included in the spreadsheet cell.

5. The system of claim 1, wherein the memory stores the computer executable instructions that, when executed by the at least one processing unit, causes the system to further perform an operation of displaying an updated image in a second spreadsheet cell.

6. The system of claim 1, wherein the memory stores the computer executable instructions that, when executed by the at least one processing unit, causes the system to further perform an operation of receiving the image by one of:
pasting the image into the spreadsheet cell;
dropping the image into the spreadsheet cell;
retrieving the image from storage based on a file locator; and
inserting the image into the spreadsheet cell.

7. The system of claim 1, wherein the display property comprises opacity, luminance, or brightness.

8. A computer-implemented method of a spreadsheet application, comprising:
selecting an image associated with a spreadsheet cell;
rendering the image in the spreadsheet cell using a display property having a numeric value;
using a function of the spreadsheet application to obtain the numeric value of the display property from data of the image associated with the spreadsheet cell;
changing, using a calculation function of the spreadsheet application and data from another spreadsheet cell, the numeric value of the display property, wherein the calculation function comprises one or more of a blur function, a sharpen function and a glow function; and
providing, for display in the spreadsheet cell, the image with the display property modified based on the changed numeric value.

9. The method of claim 8, wherein the display property comprises an image size, an image aspect ratio, or an image resolution.

10. The method of claim 8, wherein the calculation function is executed when a condition associated with the image is met.

11. The method of claim 8, wherein the calculation function comprises selecting multiple spreadsheet cells and performing the calculation function using information contained in each of the spreadsheet cells.

12. The method of claim 8, wherein the data of the image includes image data and image metadata, and the numeric value of the display property is obtained from the image metadata associated with the image.

13. The method of claim 8, wherein the data of the image includes pixel data, and the numeric value of the display property is obtained from the pixel data corresponding to the image.

14. The method of claim 13, wherein the pixel data is placed in various rows and columns of the spreadsheet application.

15. The method of claim 8, wherein the display property comprises opacity, luminance, or brightness.

16. One or more computer storage media storing computer-useable instructions that, when used by one or more computing devices, cause the one or more computing devices to perform operations comprising:
rendering an image associated with a spreadsheet cell using a display property having a numeric value;
using a function of a spreadsheet application to obtain the numeric value of the display property;
obtaining data from another spreadsheet cell;
providing the numeric value of the display property and the data from the another spreadsheet cell to a calculation function associated with the spreadsheet application, wherein the calculation function comprises one or more of a blur function, a sharpen function and a glow function;
using the calculation function to generate an updated image with an altered appearance in which the display property of the image has changed; and
causing a display of the updated image in the spreadsheet cell.

17. The one or more computer storage media of claim 16, wherein the numeric value of the display property is obtained from pixel data of the image.

18. The one or more computer storage media of claim 16, wherein the display property comprises opacity, luminance, or brightness.

19. The one or more computer storage media of claim 16, wherein the display property comprises an image size, an image aspect ratio, or an image resolution.

* * * * *